(12) United States Patent
Ginis et al.

(10) Patent No.: US 11,910,201 B2
(45) Date of Patent: *Feb. 20, 2024

(54) METHOD AND APPARATUS FOR QUALIFYING CUSTOMERS AND DESIGNING A FIXED WIRELESS NETWORK USING MAPPING DATA

(71) Applicant: Sail Internet, Inc., Fremont, CA (US)

(72) Inventors: Georgios Ginis, San Mateo, CA (US); Amitkumar Mahadevan, Edison, NJ (US); Xia (Sharon) Wan, Saratoga, CA (US); Kevin D. Fisher, Palo Alto, CA (US)

(73) Assignee: Sail Internet, Inc., Palo Alto, CA (US)

( * ) Notice: Subject to any disclaimer, the term of this patent is extended or adjusted under 35 U.S.C. 154(b) by 510 days.

This patent is subject to a terminal disclaimer.

(21) Appl. No.: 17/258,735

(22) PCT Filed: Jun. 27, 2019

(86) PCT No.: PCT/US2019/039617
§ 371 (c)(1),
(2) Date: Jan. 7, 2021

(87) PCT Pub. No.: WO2020/014000
PCT Pub. Date: Jan. 16, 2020

(65) Prior Publication Data
US 2021/0289366 A1 Sep. 16, 2021

Related U.S. Application Data

(60) Provisional application No. 62/696,742, filed on Jul. 11, 2018.

(51) Int. Cl.
*H04W 16/18* (2009.01)
(52) U.S. Cl.
CPC .................. *H04W 16/18* (2013.01)

(58) Field of Classification Search
CPC ...... H04W 16/18; H04W 88/08; H04W 24/02
See application file for complete search history.

(56) References Cited

U.S. PATENT DOCUMENTS

| 5,890,076 A | 3/1999 | Takano et al. |
| 7,127,212 B2 | 10/2006 | Fattouch |

(Continued)

FOREIGN PATENT DOCUMENTS

| CA | 3106147 A1 | 1/2020 |
| CA | 3116873 A1 | 4/2020 |

(Continued)

OTHER PUBLICATIONS

ASSET by TEOCO: www.teoco.com/products/planning-optimization/asset-radio-planning.

(Continued)

*Primary Examiner* — Abdullahi Ahmed
(74) *Attorney, Agent, or Firm* — Elliott, Ostrander & Preston, P.C.

(57) ABSTRACT

A customer location is identified that can be served by a base-station in a fixed wireless communication system. Embodiments of the invention generate a viewshed for an antenna of the base-station, compute an area of a rooftop at the customer location that is included in the generated viewshed, and identify the customer location as able to be served, or not, by the base-station, based on the area of the rooftop at the customer location that is included in the generated viewshed. Further, a parcel of land on which to install a fixed wireless communication base-station can be identified. Each candidate base-station parcel of land in a list ("candidate base-station locations") is evaluated and ranked. An evaluated candidate base-station location having a particular ranking is selected as the location on which to install the base-station.

18 Claims, 18 Drawing Sheets

(56) References Cited

U.S. PATENT DOCUMENTS

| | | | |
|---|---|---|---|
| 7,499,890 | B1 | 3/2009 | Allen |
| 8,983,470 | B1 | 3/2015 | Ryan et al. |
| 9,602,224 | B1* | 3/2017 | McLaughlin ............ G01S 17/10 |
| 10,021,576 | B1 | 7/2018 | Mclaughlin et al. |
| 10,271,229 | B1* | 4/2019 | McLaughlin ............ G01S 17/88 |
| 2003/0023412 | A1 | 1/2003 | Rappaport et al. |
| 2004/0235484 | A1 | 11/2004 | Korpela et al. |
| 2009/0125356 | A1 | 5/2009 | Allen |
| 2009/0244070 | A1 | 10/2009 | Mattikalli et al. |
| 2013/0176881 | A1 | 7/2013 | Fan et al. |
| 2014/0162627 | A1 | 6/2014 | Tarokh et al. |
| 2014/0365409 | A1 | 12/2014 | Burch et al. |
| 2015/0029176 | A1* | 1/2015 | Baxter .................... G06T 19/00 345/419 |
| 2015/0341502 | A1 | 11/2015 | Udeshi et al. |
| 2016/0037550 | A1 | 2/2016 | Barabell et al. |
| 2017/0171762 | A1 | 6/2017 | Reis et al. |
| 2018/0025452 | A1 | 1/2018 | Fadeev et al. |
| 2018/0316416 | A1 | 11/2018 | Reis et al. |
| 2020/0367067 | A1 | 11/2020 | Haley et al. |
| 2021/0003525 | A1 | 4/2021 | Ginis |
| 2021/0250778 | A1* | 8/2021 | Tsutsui .................. H04W 16/18 |
| 2021/0289366 | A1* | 9/2021 | Ginis .................... H04W 24/02 |
| 2022/0110001 | A1* | 4/2022 | Ginis .................... H04W 24/02 |
| 2023/0138084 | A1* | 5/2023 | Kourous-Harrigan ........................ G06T 17/00 701/41 |

FOREIGN PATENT DOCUMENTS

| | | | |
|---|---|---|---|
| CA | 3122688 | A1 | 6/2020 |
| CN | 101662778 | A | 3/2010 |
| EP | 3821632 | A1 | 5/2021 |
| EP | 3868142 | A1 | 8/2021 |
| EP | 3895465 | A1 | 10/2021 |
| KR | 1020070014270 | A | 2/2007 |
| WO | 9933298 | A1 | 7/1999 |
| WO | 2011130914 | A1 | 10/2011 |
| WO | 2016086669 | A1 | 6/2016 |
| WO | 2017135878 | A1 | 8/2017 |
| WO | 2020014000 | A1 | 1/2020 |
| WO | 2020081302 | A1 | 4/2020 |
| WO | 2020123208 | A1 | 6/2020 |

OTHER PUBLICATIONS

ATOLL by Forst: http://www.forsk.com/atoll-overview.
Extended European Search Report for European Patent Application No. 19/834,059, dated Mar. 17, 2022, 5 pages.
Extended European Search Report for European Patent Application No. 19873184.6, dated Jun. 15, 2022, 9 pages.
Extended European Search Report for European Patent Application No. 19895757.3, dated Mar. 17, 2022, 5 pages.
International Preliminary Report on Patentability for International Patent Application No. PCT/US2019/055261, dated Apr. 29, 2021, 7 pages.
International Search Report and Written Opinion for International Patent Application No. PCT/US2019/055261, dated Jan. 31, 2020, 10 pages.
people.math.gatech.edu/~thomas/FC/fourcolor.html.
"en.wikipedia.org/wiki/Cellular_network," (accessed Nov. 25, 2019), 8 pages.
"en.wikipedia.org/wiki/Fresnel_zone," (accessed Jun. 27, 2019), 5 pages.
"trac.osgeo.org/grass/browser/grass/trunk/raster/r.viewshed," (2018), 1 page.
Bartie, P., "Advances in Visibility Modelling in Urban Environments to support Location Based Services," University of Canterbury Christchurch, New Zealand, 2011 (retrieved on Sep. 3, 2019), Retrieved from the Internet https://pdfs.semanticscholar.org/0f31/259d76a2bb60865a8926840df89c78949d6e.pdf, 217 pages.
Chao, F., et al., "Parallel algorithm for viewshed analysis on a modern GPU," International Journal of Digital Earth, vol. 4, Issue 6 (2011), pp. 471-486.
Heilmair, Christoph, "GPU-based visualisation of viewshed from road or areas in a 3D environment," Master of Science Thesis in Electrical Engineering, Linköping University, Sweden, 2016, LiTH-ISY-EX-16/4951-SE (2016), 71 pages.
International Preliminary Report on Patentability for International Patent Application No. PCT/US19/064322, dated Jun. 24, 2021, 7 pages.
International Search Report and Written Opinion for International Patent Application No. PCT/US19/64322, dated Apr. 6, 2020, 10 pages.
International Search Report and Written Opinion for International Patent Application No. PCT/US2019/039617, dated Oct. 18, 2019, 12 pages.
Tipper, D., "www.pitt.edu/~dtipper/2720/2720_Slides4.pdf," accessed Nov. 25, 2019, 22 pages.
Toma, L..., et al., r.viewshed algorithm described at "grass.osgeo.org\\grass74\\manuals\\r.viewshed.html," (2018), 5 pages.
Non-Final Office Action for U.S. Appl. No. 17/311,654, dated Jun. 13, 2023, 15 pages.
Final Office Action for U.S. Appl. No. 17/311,654, dated Sep. 26, 2023, 17 pages.
Non-Final Office Action for U.S. Appl. No. 17/285,880, dated Oct. 13, 2023, 14 pages.
Advisory Action for U.S. Appl. No. 17/311,654, dated Nov. 17, 2023, 4 pages.

* cited by examiner

METHOD AND APPARATUS FOR QUALIFYING CUSTOMERS AND DESIGNING A FIXED WIRELESS NETWORK USING MAPPING DATA

CROSS-REFERENCE TO RELATED APPLICATIONS

This application is a U.S. National Phase application under 35 U.S.C. § 371 of International Application No. PCT/US2019/039617, filed Jun. 27, 2019, entitled "METHOD AND APPARATUS FOR QUALIFYING CUSTOMERS AND DESIGNING A FIXED WIRELESS NETWORK USING MAPPING DATA", and this Application claims the benefit of U.S. provisional patent application No. 62/696,742, filed Jul. 11, 2018, entitled "Method and Apparatus for Qualifying Customers and Designing a Fixed Wireless Network Using Mapping Data.

TECHNICAL FIELD

The present invention relates to the field of wireless internet access, and in particular to providing wireless internet access to subscribers using computing devices at fixed locations.

BACKGROUND

Wireless Internet Access

Internet access is a fundamental need of individuals and organizations. Internet access has traditionally been delivered using wireline technologies such as digital data transmission over telephone lines using Digital Subscriber Line (DSL) technology, cable television infrastructure technology ("Cable"), and fiber optic technology ("Fiber"). Internet access is increasingly being delivered wirelessly. Mobile wireless internet access is delivered to mobile devices such as smartphones, tablets and laptops. Fixed wireless internet access is delivered to residences and businesses using customer devices at a fixed location.

An example of the growing trend for delivering internet access wirelessly are the efforts to deploy 5th Generation Wireless Systems, also known as 5G technologies. The ITU-T IMT-2020 specifications set targets for 5G for throughput, latency, mobility, and connection density. These targets are significantly more demanding than existing 4G wireless systems. Release 15 of the 3rd Generation Partnership Project (3GPP) is the first set of standards for 5G. Several network operators have announced plans to launch services based on 5G technologies. These plans include both fixed wireless and mobile wireless services.

Besides 5G, there are many other examples of wireless technologies that are evolving to meet the increasing needs for wireless delivery of internet access. Point-to-point radios operating in the microwave and millimeter-wave (mmwave) bands now achieve data transmission speeds exceeding 1 Gbps, and reaching as high as 5 or 10 Gbps. Free-space optical communication systems operating in the visible or infrared bands can achieve data transmission speeds on the order of 20 Gbps at distances as far as 20 km. Point-to-multipoint radios are also achieving aggregate rates of over 1 Gbps, and are using advanced Medium Access Control (MAC) protocols to manage how client radios share the wireless medium.

The vast majority of internet-capable devices are nowadays using WiFi °. WiFi is a set of radio wireless local area networking technologies that connect WiFi-compatible devices (e.g. within a residence or business) to one or more wireless access points using IEEE 802.11 standards. The wireless access points are themselves connected to the internet using any of the access technologies mentioned above. WiFi technologies are also improving rapidly to support higher throughput and higher device density, and to allow operation in higher frequencies.

The demands for higher throughput, lower latency and higher connection density lead to two fundamental changes in the design of wireless systems:

1. Wireless systems must use larger amounts of radio spectrum
2. Wireless base-stations must be located closer to the customer device Wireless internet access is increasingly using "mid-band" (3 to 6 GHz) or "high-band" (greater than 6 GHz) spectrum in either licensed or in unlicensed bands. Previous generations of wireless systems for internet access relied heavily on "low-band" frequencies to transmit data. For example, the majority of 4G wireless systems today use frequencies below 3 GHz. 5G wireless systems are expected to additionally use higher frequencies, such as microwave frequencies above 3 GHz, and millimeter-wave (mmwave) frequencies (starting at 30 GHz). Another example is the use of unlicensed bands by Wireless Internet Service Providers (WISPs). These have traditionally included the 915 MHz, 2.4 GHz, and 5 GHz bands, with more recent use of the 24 GHz and 60 GHz bands.

The use of higher frequencies leads to larger attenuation of the radio signals for a given distance. This, combined with the needs for higher throughput, lower latency and higher connection density, requires shorter distances between base-stations and customer devices, and consequently requires more base-stations in each served area. For existing 4G wireless systems that use a cellular architecture, the transition to 5G involves the addition of small cells with a smaller footprint than traditional macro-cells. This process of adding small cells to supplement existing macro-cells is known as densification.

A second consequence of using higher frequencies is that radio signals propagate mainly via line-of-sight (LOS) paths. Building walls and foliage mostly block radio signals operating at these higher frequencies. This further complicates the design of cells: the signal range can no longer be approximated as a circle with the base-station at the center. The presence of structures and vegetation can affect the area that can be reliably served by the base-station.

Wireless Internet Service Providers

A Wireless Internet Service Provider (WISP) delivers internet access services to residential and business customers using wireless technology for the last segment. Many WISPs operate in rural and relatively isolated areas, where wireline infrastructure (e.g. DSL or coaxial cable) is old, limited or non-existent. Distances between base-station and served homes can be on the order of kilometers, and therefore, speeds are modest. Base-stations are installed on tall towers, or other structures that provide good visibility to the surrounding area. Customer devices are installed on the customer property, and preferably on prominent locations such as roofs, chimneys, masts, etc.

There are also WISPs operating in dense urban areas. Because they use wireless technologies, they can be faster in meeting customers' connectivity needs than wireline ISPs, which often require a long time to upgrade infrastructure (e.g. to install fiber optic lines). Urban WISPs use point-to-point radios installed on tall high-density buildings to create a wireless mesh network. Ethernet or other wireline technologies connect the radios to switching equipment in one or more common rooms (e.g., a Main Point of Entry (MPOE) room). Ethernet or other wireline technologies further connect the switching equipment to individual units of the building.

WISPs have until recently had limited presence in suburban areas.

Problems in the Prior Art

Fixed Wireless Internet Access for Suburban Areas

Internet access to residences and businesses in suburban areas is predominantly delivered today via wireline technologies, i.e., DSL, Cable and Fiber. Within such residences and businesses, WiFi is the preferred technology for connecting devices to an access point. The access point is connected to the internet via a DSL modem, a cable modem, or a fiber optic modem. (In some cases, the access point and the modem are a single, integrated device.)

Using wireless technologies for fixed internet access in suburban areas presents the following challenges:

1. Wireline technologies can deliver very high speeds in such areas, so fixed wireless technologies must at least match and preferably exceed these speeds. New DSL standards (e.g. VDSL and G.fast) can deliver speeds above 50 Mbps, and DOCSIS 3.0 and 3.1 standards for cable enable aggregate (shared) capacities exceeding 1 Gbps.
2. Wireless spectrum can be scarce in suburban areas. Licensed low-band spectrum (e.g. below 3 GHz) is either entirely unavailable (previously bought by mobile service providers), or very expensive to acquire. Unlicensed spectrum (especially in the 915 MHz, and 2.4 GHz bands) is often congested.
3. Physical space for installing wireless infrastructure can be difficult to find. Building wireless towers or leasing space on existing towers is an expensive and complex process, which is further complicated by community concerns and by local permitting regulations.

These challenges are reinforced by the two trends for wireless internet access described earlier: the move toward using higher frequency spectrum and the need to build small cells. And the challenges lead to three important problems to overcome, as discussed below.

Problem 1: Building the Fixed Wireless Infrastructure

Providing internet services via fixed wireless to residences and homes within a metro area requires the construction of a highly dense network of base-stations.

To achieve internet speeds to individual customers of at least 100 Mbps, and assuming that only frequencies above 3 GHz are available, base-stations are expected to serve an area with an approximate radius between 300 and 1500 meters. Antennas of such base-stations have to be placed at prominent locations within the city. Because higher frequencies require line-of-sight (or near-line-of-sight) to consistently deliver the required speeds, served areas can be impacted by the presence of structures or vegetation, which may require construction/installation of additional base-stations.

For serving a city the size of San Jose (180 square miles), and making the over-simplified assumption of each base-station serving 0.1 square miles, an approximate total of 1800 base-stations are required. It is critical for construction, permitting, leasing, hardware and licensing costs to be kept low for each base-station.

Several mobile service providers are currently building (or have plans to build) small cells as part of the 4G and 5G infrastructure plans. They often choose utility poles or street-lighting poles for mounting the required hardware. But using such poles is most often subject to strict city regulations, and an extensive period of review and consultation may be required before approval for construction is granted. In addition, the leasing costs can be very substantial.

Certain WISPs operating in dense urban areas often mount antenna gear on rooftops of high-rise buildings. This approach has the advantage of largely eliminating the need to construct towers, or lease space on existing towers. Such rooftops are prominent and can have very good visibility to other buildings. Each rooftop offers multiple potential locations for antennas, which gives much better choice compared to utility or street-lighting poles. Finally, the building owner has a strong incentive to agree with installing the antenna gear on the roof, because residents or tenants of the building can then be served by the WISP. Although this approach is attractive for downtown areas, it does not scale to serving suburban regions. Building a mesh-network using point-to-point links from rooftops of high-rise buildings makes sense when each building has a substantial number of customers that can be served. However, this architecture becomes inefficient if one extends it to suburban homes, when one can expect only a single customer per building.

Problem 2: Customer Qualification

Assuming that a network of base-stations is available, the service provider must then acquire customers and provide internet access to them. This includes two steps: first, the service provider advertises the service to potential customers within the service area; second, the service provider proceeds with service installation for those customers that sign up for service.

Both of these steps are complicated by the use of high frequencies, and by the use of small cells. Because signal propagation at these high frequencies is severely affected by vegetation and building walls, the customers served by a base station can no longer be determined just based on conventional factors such as the distance between the base-station and the customer location. The qualification of the customer now depends on the line-of-sight (LOS) path between the base-station antenna and the customer radio antenna. The line-of-sight depends on trees, bushes, structures, walls, fences, etc. that may be present.

Qualification is further constrained by the location of the customer radio antenna. Such an antenna must be securely mounted, and at a location where the signal is not obstructed. Often, a roof location is most desirable for single-family homes, and a technician visit is required to install the antenna and to make sure that the service performs as expected.

Having accurate qualification results is necessary for effective advertising of the service to customers. Advertising to customers that cannot receive service is a waste of time and effort, but also an annoyance to customers receiving ads but then discovering that the service is not available or fails to meet expected or advertised performance measures. Knowing the customers that cannot be served, and avoiding advertising to them, allows resources to be allocated to more productive uses.

In addition, accurate qualification eliminates very significant costs related to service installation. Lacking customer qualification results, a request for service by a potential customer must be followed by a costly technician visit to survey the location and evaluate if it can be served by a neighboring base-station. If qualification results are available in some form but are inaccurate, then there are two potential issues. If the location is mistakenly identified as serviceable (a false positive), then technician time is wasted on a failed installation. Customer frustration can also be expected. If the location is mistakenly identified as not serviceable (a false negative), then the service provider is forgoing the related revenue.

Current practices for customer qualification for fixed wireless service are either based on crude estimates for determining whether a base-station can service a residence or business, or require a technician to visit the location for a survey.

At its most basic, customer qualification is based on the distance between a known base-station and the location to be served. If the distance is below a threshold, then the customer is categorized as potentially able to be served. This approach entirely ignores LOS limitations, which results in a high percentage of false positive and false negative cases.

An incremental improvement is to take into account terrain data and to produce a so-called viewshed of the base-station. The viewshed of a location is defined as the area that is visible from that location. Terrain data represent the terrain elevation for each point on a map (typically relative to sea-level). By computing the viewshed of the base-station, one can determine which points on a map can be "seen" by a base-station. This provides some information about which homes and businesses may potentially be served, but remains very approximate for the following reasons: First, the terrain data do not capture vegetation or structures that may block LOS. This is of particular concern in urban and suburban areas, where base-stations cannot be mounted on very tall towers, and where trees and buildings create a challenge for signal transmission. Second, even if the viewshed shows that a location is "illuminated", there is still uncertainty about whether the customer antenna can actually be installed at the customer side. For example, an antenna should not be installed on a tree, or in the middle of a backyard. Third, the viewshed may not provide sufficient information about signal propagation. Obstacles present in or near the LOS path can create reflective signal paths that can combine destructively at the receiver side.

The limitations of these techniques have led most WISPs to rely on site surveys by technicians to make the final determination of whether a customer can be served or not. During such a site survey, the technician checks LOS from the roof of the customer's or nearby building to nearby base-stations. At the same time, the technician checks factors such as distance from the base-station to the customer location and obstacles near the LOS path. The goal is to identify a suitable rooftop location for installing the customer antenna that will connect to the base-station with as few obstacles as possible in or near the LOS path. A secondary goal of the site survey is to identify how to install a cable from the antenna location to the indoor location where the home or business router is located. Assuming that the technician decides that service installation is possible, it is most often the case that the actual service installation takes place during a second technician visit. It is obvious that conducting a site survey for every potential customer is a very burdensome requirement.

Problem 3: Network Design

A service provider that wants to provide service to a new metro area, or that wants to expand service within a currently served metro area must make decisions on the locations of new base-stations. These decisions have to be based on both business and technical considerations.

New base-stations should be built only where there is a reasonable expectation that they will serve a sufficient number of new customers, or that they will improve service for a substantial number of existing customers. Construction and maintenance of a base-station have substantial costs, which should be recovered by corresponding revenue. A base-station built at a location that can serve very few customers represents a waste of resources. Resources are much better allocated if the location can be judiciously chosen such that many customers can be served by it.

Selection of the location of a base-station is complicated by the use of high frequencies, and by the use of small cells. As discussed earlier, the use of high frequencies leads to signal propagation being severely affected by buildings walls and vegetation. In addition, the use of small cells makes it harder to mount base-station antenna hardware on tall towers (as previously done for macro-cells). That would involve both high costs for building towers and risks of serious community objections based on aesthetics. For example, a central location in an urban area may at first appear to be attractive for installing a base-station to serve nearby homes and businesses. However, if tall vegetation or buildings surround that location, it may in fact be a very poor choice.

Another important factor in selecting a location for a new base-station is the ability to provide backhaul connections from the new base-station to the service provider's backbone network. Even if a base-station were ideally located to serve a large number of customers, it would be useless unless it has a way to connect to the rest of the network. A related complication is that using wireline technology for backhaul connections to small cell-sites is often too expensive or simply not feasible (e.g., if new cable needs to be installed).

Current practices for selecting locations of new base-stations for fixed wireless service rely heavily on labor-intensive practices and on qualitative measures. As mentioned previously, the selection of the location of the base-station must meet two requirements: it must be such that it can potentially serve a large number of customers, and it must have a way to connect to the backbone network.

The standard approach is to identify a candidate base station location based on its geographical prominence. A tall building with an accessible roof that stands higher than the surrounding buildings is one such example. Existing cell-towers, water towers, and grain towers are examples often used in rural environments. Properties located on hills with clear views towards urban and suburban areas are yet another example. After initial identification of such a location, a site survey is then scheduled to verify that the location is indeed characterized by a large viewshed, that there is a way to build a backhaul connection (most often using wireless communication technologies), and that installation of wireless antennae and other hardware is feasible. Before a survey is scheduled, the property owner must be contacted to agree to provide access.

Such an assessment of locations (and especially the viewshed estimate) is necessarily of a qualitative and subjective nature, and may lack accuracy. In addition, the process requires a significant amount of time for scheduling site surveys. It is possible that promising locations are overlooked, because of lack of time, or because of inaccurate viewshed estimates.

An improved approach is to make use of geographical data available through software systems such as Google Earth and ArcGIS. Such software systems are capable of performing viewshed calculations and can help with an initial assessment of a candidate location without requiring a site survey. Service providers can generate the viewshed of a candidate location. Examining the viewshed in conjunction with a street map gives information about areas that can be served by a base-station installed at the candidate location.

This approach provides much better information compared to the entirely subjective method of visually estimating the viewshed. However, it still faces the following limitations: First, even if a viewshed map is available, it is not straightforward (or is at least time-consuming) to estimate the number of residences or businesses that can potentially be served. The viewshed area is not a sufficient metric on its own, since parts of the viewshed covering uninhabited space (hills, parks, water) cannot be expected to help serve customers. It is possible to manually count homes or businesses that overlap with the viewshed, but that is a very tedious and time-consuming process. Second, data used by commonly available software systems can be outdated. For suburban environments, digital surface models (DSM) data available through Google Earth are usually several years old. That means that viewshed estimates may lack accuracy. Third, this approach does not provide much insight into the question of building multiple base-stations to provide service to customers in a target area. It helps with (greedily) selecting a location for a first base-station, but does not jointly evaluate multiple locations to select more than one base-stations.

SUMMARY

A method and apparatus for identifying a customer location that can be served by a base-station in a fixed wireless communication system is described. Embodiments of the invention generate a viewshed for an antenna of the base-station, compute an area of a rooftop at the customer location that is included in the generated viewshed, and identify the customer location as able to be served, or not, by the base-station, based on the area of the rooftop at the customer location that is included in the generated viewshed. Another method and apparatus is described for selecting a parcel of land ("location") on which to install a fixed wireless communication base-station, comprising receiving a list of candidate base-station parcels of land ("candidate base-station locations"), evaluating each candidate base-station location in the list, ranking the evaluated candidate base-station locations, and selecting an evaluated candidate base-station location having a particular ranking as the location on which to install the base-station.

DETAILED DESCRIPTION

Building Fixed Wireless Network Infrastructure

Figure 1:
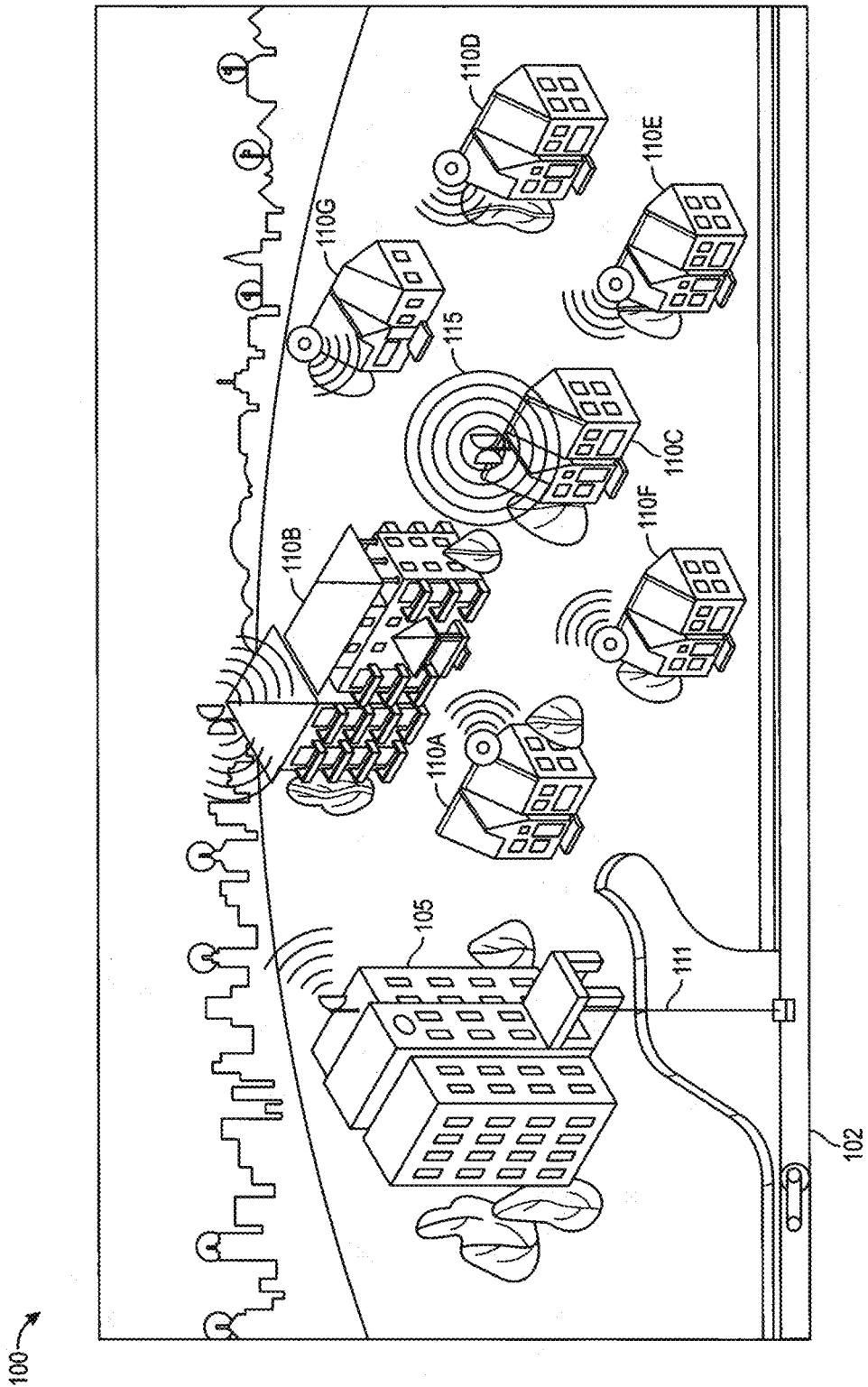
FIG. 1 is a depiction of a fixed wireless architecture.

A new architecture 100 for fixed wireless communication services (or simply, "fixed wireless") is shown in FIG. 1, which can be used in suburban as well as in urban environments. In this architecture, a wireline-fed, e.g., fiber-fed, business or data-center 105 serves as a central node. The data-center 105 is connected via fiber drop cable 111 to fiber line 102. The central node has point-to-point wireless connections to multiple sites (also known as "relay node sites", or simply, "relay nodes") 110B, 110C such as apartment/condo complexes, office buildings, and single-family homes. These connections allow residents or tenants at each relay node site to be served. Additionally, base-station equipment can be located at rooftops of such sites, through which neighboring residences or businesses can be served via point-to-multipoint wireless connections. For example, in FIG. 1, a base-station 115 is mounted atop the relay node 110C and is serving multiple end customers in single-family homes 110A, 110D-110G. Finally, relay node sites can have additional point-to-point wireless connections to neighboring relay node sites further away from the data-center.

Figure 2:
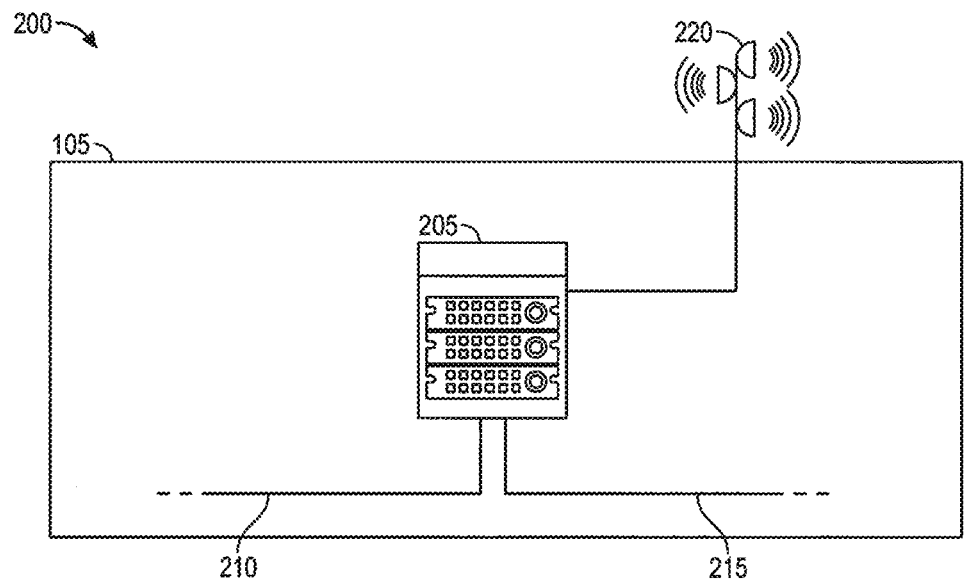
FIG. 2 illustrates networking equipment installed at a data-center or where space is available in a fiber-fed business.

This architecture is next explained in detail. Networking equipment 205 can be installed at a data-center 105 or at space available in a fiber-fed business as shown at 200 in FIG. 2. Such data-centers typically have connections 210 to multiple wholesale internet service providers that are known as "IP transit" providers. They may also offer interconnect service 215 to other data-centers. In FIG. 2, the link(s) 210 to IP transit provide the means for the fixed wireless network to connect to the rest of the internet. The link(s) 215 to other data-centers provide redundancy and may be used to balance internet traffic. The networking equipment is further connected to roof-top radio hardware 220 that creates links to other sites (or relay nodes).

Figure 3:
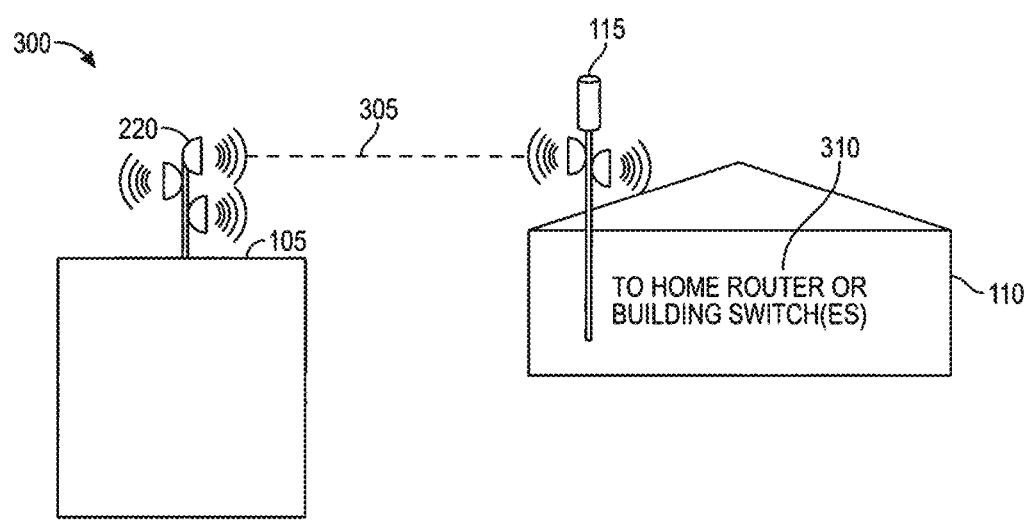
FIG. 3 illustrates a data-center connected to multiple relay nodes using Point-to-Point (PtP) high-capacity wireless links (backhaul).

A data-center 105 can connect to multiple relay nodes 110 using Point-to-Point (PtP) high-capacity wireless links (backhaul) 305 as shown at 300 in FIG. 3. Various technologies can be used depending on factors such as distance and frequencies available. Generally speaking, lower frequencies are more appropriate for longer distances, e.g., 11 and 18 GHz licensed bands can be used for links in the order of 10 to 30 km. Higher frequencies are more appropriate for shorter distances, e.g., 24 GHz and 60 GHz (unlicensed), or 70/80 GHz (licensed). Each relay node 110 has appropriate networking equipment 310 to serve units within the node, e.g., to provide communication services to customers in an apartment building that is a relay node.

Figure 4:
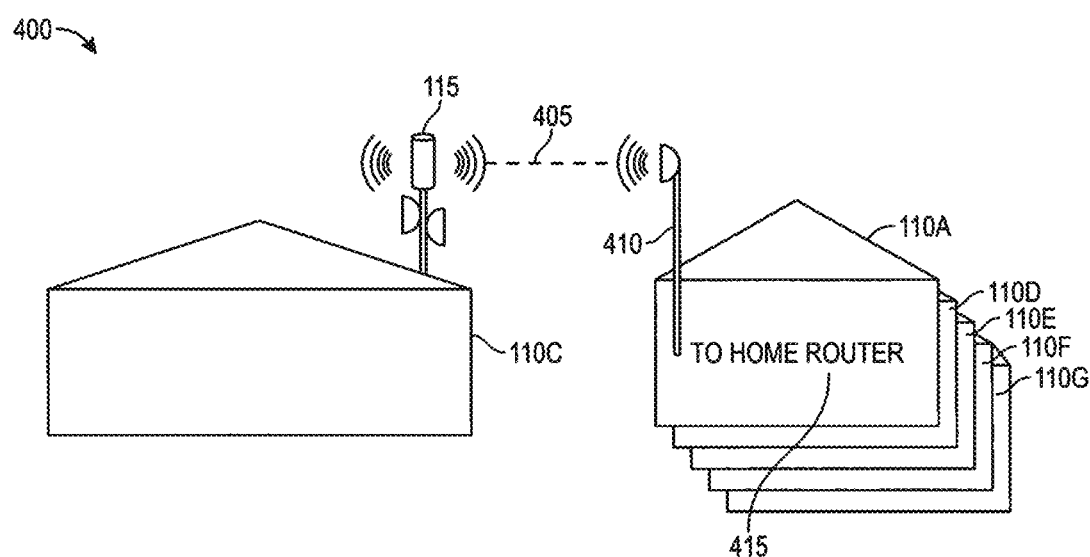
FIG. 4 illustrates base-stations installed at relay nodes.

Base-stations 115 can then be installed at relay nodes 110 as shown at 400 in FIG. 4. The base-stations then use Point-to-Multi-Point (PtMP) radio technology 405 to serve residences and businesses. PtMP technology can use various unlicensed or licensed bands. For example, PtMP can use hardware operating in the 5 GHz band, employing a protocol similar to IEEE 802.11ac WiFi, but with extensions for quality monitoring, diagnostics, and a modified Time Division Multiple Access Media Access Control (TDMA MAC), which eliminates collisions and improves spectrum reuse. At residences or businesses 110A, 110D-110G, e.g., in FIG. 4, a wireless device 410 is installed, typically on a rooftop, but possible on or near a window. This device is connected via cable to the local router 415, which provides an internet connection to devices within the residence or business.

Customer Qualification

Embodiments of the customer qualification method and apparatus described herein identify the customer locations that can be served by existing base-stations with a dramatically increased level of accuracy compared to prior art methods. This level of accuracy enables targeted advertising to customers at only those locations that can be served. In addition, it greatly reduces the need for conducting site surveys before installing service.

Geographical Data

Embodiments of the invention use one or more sets of geographical data as inputs. Before describing this embodiment, geographical data are explained. Generally speaking, geographical (or geospatial) data refers to data that include the geographical location of natural, constructed, or abstract features on earth (e.g. rivers, buildings, countries). Geographic data is usually stored as sets of coordinates using a coordinate system. The longitude/latitude representation is the best-known geographical coordinate system.

A Digital Elevation Model (DEM) is a representation of elevation data of points of or on a surface. When the surface is the earth's terrain (not including objects such as buildings or vegetation), it is called a Digital Terrain Model (DTM). When the surface includes objects such as buildings and vegetation, it is a called a Digital Surface Model (DSM). Elevation values can be relative to sea level or some other defined reference level. A standard format for representing DEM/DTM/DSM data is to store elevation values for an orthogonal grid of points in a permanent data store.

Parcel or property data are representations of property boundaries. Such boundaries are typically represented as polygons, where each polygon is defined by its corners. Parcel data may include associated data such as addresses, land-use information, zoning information, data about the building or buildings on the parcel, tax information, etc. In the state of California in the USA, for example, parcel data are maintained by each county and are used for purposes of assessing property taxes.

An orthogonal-image ("ortho-image", or an ortho-photograph or "ortho-photo") is an aerial photograph or image that has been geometrically corrected such that it has a uniform scale. This correction compensates for distortions resulting from the lens, camera tilt, and topography relief.

A point cloud is a set of three-dimensional data points produced by a three-dimensional scanning process. In the case of geographical data, processes such as photogrammetry and Light Detection and Ranging (LiDAR) are used to produce the point cloud of an area. Photogrammetry uses a combination of photographs taken from many angles to create a point cloud. LiDAR systems send laser pulses and record their reflections to create a point cloud. Such point clouds can capture information about all objects on the earth's surface including vegetation and buildings. Point cloud data are used, among other things, to derive DSM data.

Figure 5:
FIG. 5 shows an example of an ortho-image of a suburban neighborhood.
Figure 6:
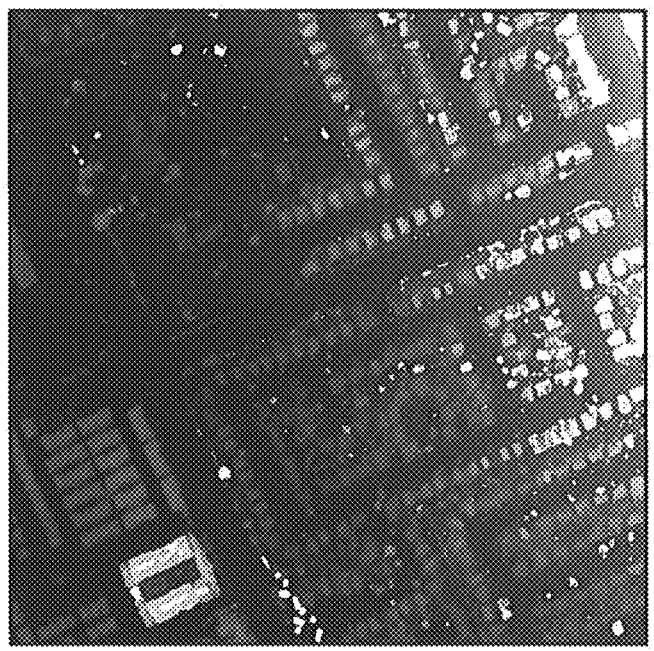
FIG. 6 shows the corresponding DSM for the area in FIG. 5, where darker shading represents lower elevation and lighter shading represents higher elevation.
Figure 7:
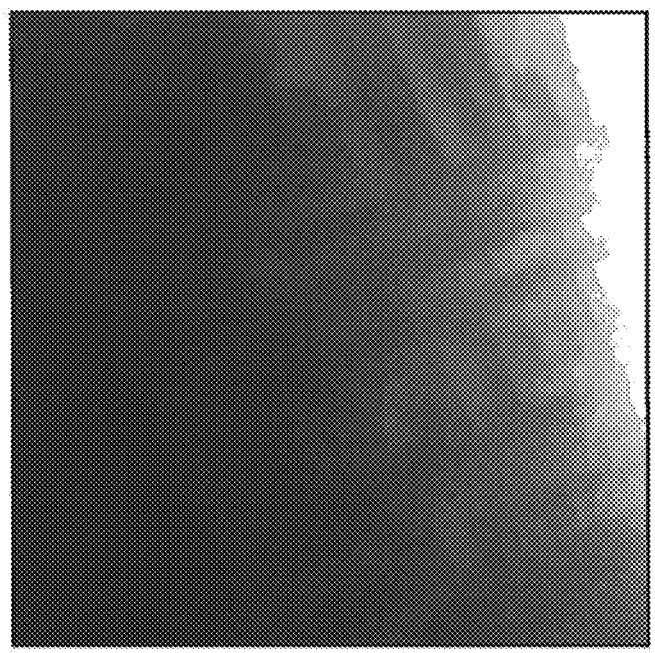
FIG. 7 shows a derived digital terrain model (DTM) for the same area in FIG. 5.
Figure 8:
FIG. 8 shows the corresponding parcel data for the area in FIG. 6.

FIG. 5 shows an example of an ortho-image of a suburban neighbourhood at 500. FIG. 6 shows the corresponding DSM for this area at 600, where darker shading represents lower elevation and lighter shading represents higher elevation. Note that rooftops and trees have lighter shading. FIG. 7 shows a derived DTM for the same area at 700. The extraction of terrain data from surface data is imperfect, and that is why the building outlines have somewhat different shading than the surrounding land. However, it is clear that the terrain has an increasing slope between the lower-left and the upper-right corners of the DTM in FIG. 7. Finally, FIG. 8 shows the corresponding parcel data at 800.

The accuracy and timeliness of geographical data are crucial for making the best use of them. For example, if DSM data are of such low accuracy that they do not fully capture vegetation or buildings, then that will have an adverse effect on the outputs of the algorithms described below. If DSM data are outdated, or derived during the winter season, then they may miss effects of vegetation growth, summer vegetation, or new construction. If parcel data are outdated, then they may not be a reliable basis for counting potential customers.

Roof Identification Data

Roof identification data are used in embodiments of the customer qualification process described herein. At its most basic, roof identification data indicate the roof areas of a building. Knowing these roof areas is important, because those areas are the most preferable (and often the only available) locations for mounting antenna equipment.

Figure 9:
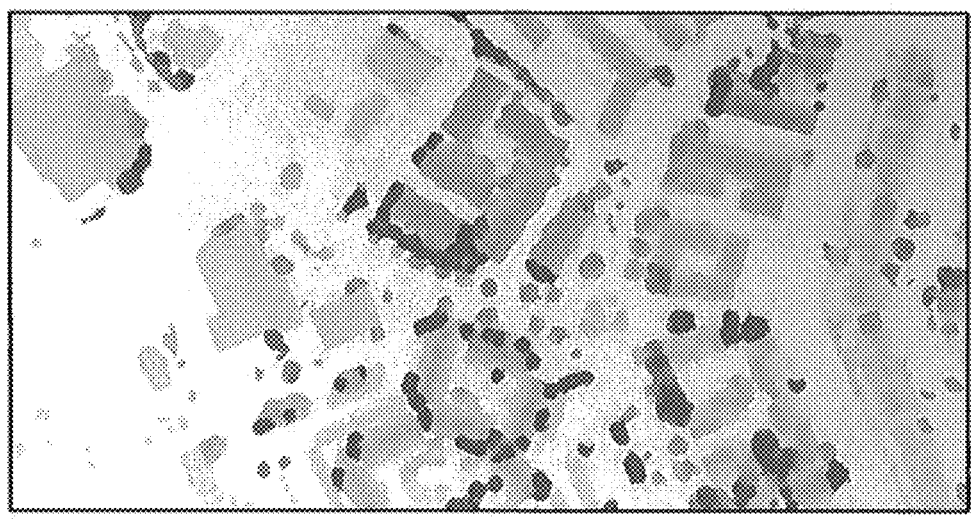
FIG. 9 shows the DSM of a neighbourhood, where darker shades correspond to higher elevation.
Figure 10:
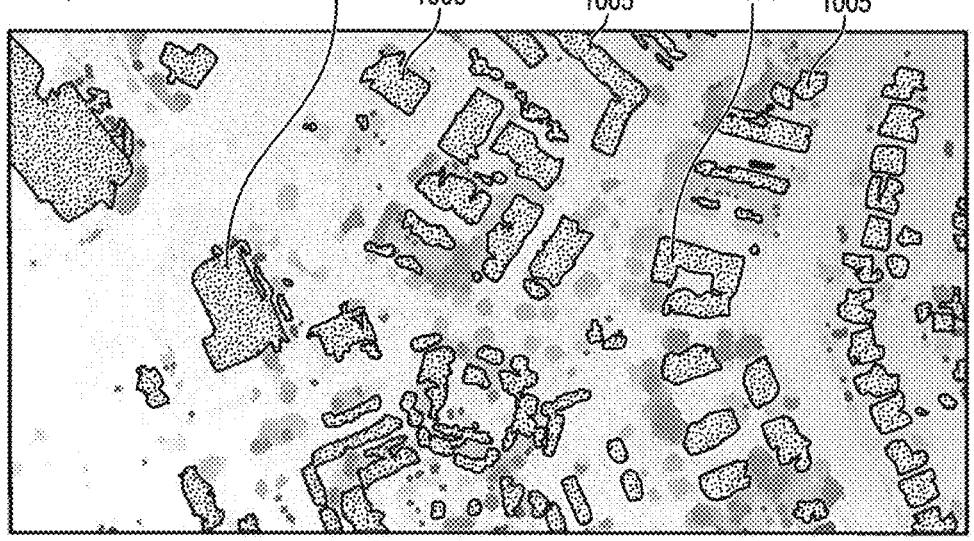
FIG. 10 shows, in addition to the DSM of a neighbourhood in FIG. 9, the areas identified as roofs.

As an example, FIG. 9 shows the DSM of a neighbourhood at 900, where darker shades correspond to higher elevation. Both buildings and tall trees are identifiable. FIG. 10 shows, in addition to the DSM, the areas 1005 identified as roofs at 1000.

There are several algorithms that can be applied to derive roof identification data. One possible approach is to apply a supervised classification algorithm. Input data to the algorithm include the ortho-images and a height map. The height map is obtained by taking the difference of the DSM and the DTM. In other words, the height map shows the height relative to ground of any structures or vegetation. The output of the algorithm is a classification of the entire map into different types of land cover (e.g. roof, road, trees, grass). Alternately, the classification can be binary, as in roof and non-roof. The algorithm is trained based on previously classified areas, which are provided as labeled training data. An example of a supervised classification algorithm that can be used is that implemented by the functions i.gensigset and i.smap of the Geographic Resources Analysis Support System (GRASS) software.

Several other approaches are possible for deriving roof identification data, some of which make use of neural networks of various types. A Convolutional Neural Network (CNN) can be trained to identify rooftops in a fashion similar to identification of objects such as cars and people in CNNs used for autonomous vehicles. One known example of roof identification is Google's Project Sunroof at www.google.com/get/sunroof#p=0, which identifies rooftops as part of estimating the benefits of a solar power installation for each home.

Roof identification data can be further extended to include additional information, such as locations on a roof that are preferable for antenna installations. For example, chimneys are often ideal for mounting antennas, because of their additional height and also for aesthetic reasons. As a second example, fascia boards, gables, and eaves are good locations for antenna mounting, and therefore it is helpful to add the locations of such to the roof identification data.

Customer Qualification Using DSM and Roof Identification Data

At its simplest, customer qualification answers the question: can base-station B serve customer C? For fixed wireless communications service applications, customer C always maps to a physical address, which corresponds to a parcel. It is reasonable to expect this parcel to have a building, on which roof (or similar space) the antenna equipment needs to be installed.

The customer qualification steps are as follows, with reference to the flowcharts in FIGS. 17A-17D, according to an embodiment 1700:

1. Generate the viewshed of base-station B at step 1710;
2. Compute at step 1720 the area of customer C's structure (e.g., rooftop) that is included in the generated viewshed of step 1710; and
3. Produce at step 1730 the customer qualification result based on computed area in step 1720.

Figure 17A:
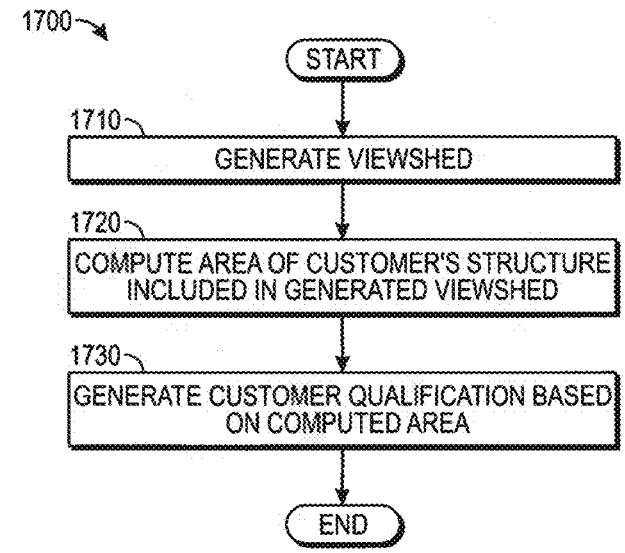
FIG. 17A is a flow chart illustrating an embodiment of the invention.
Figure 17B:
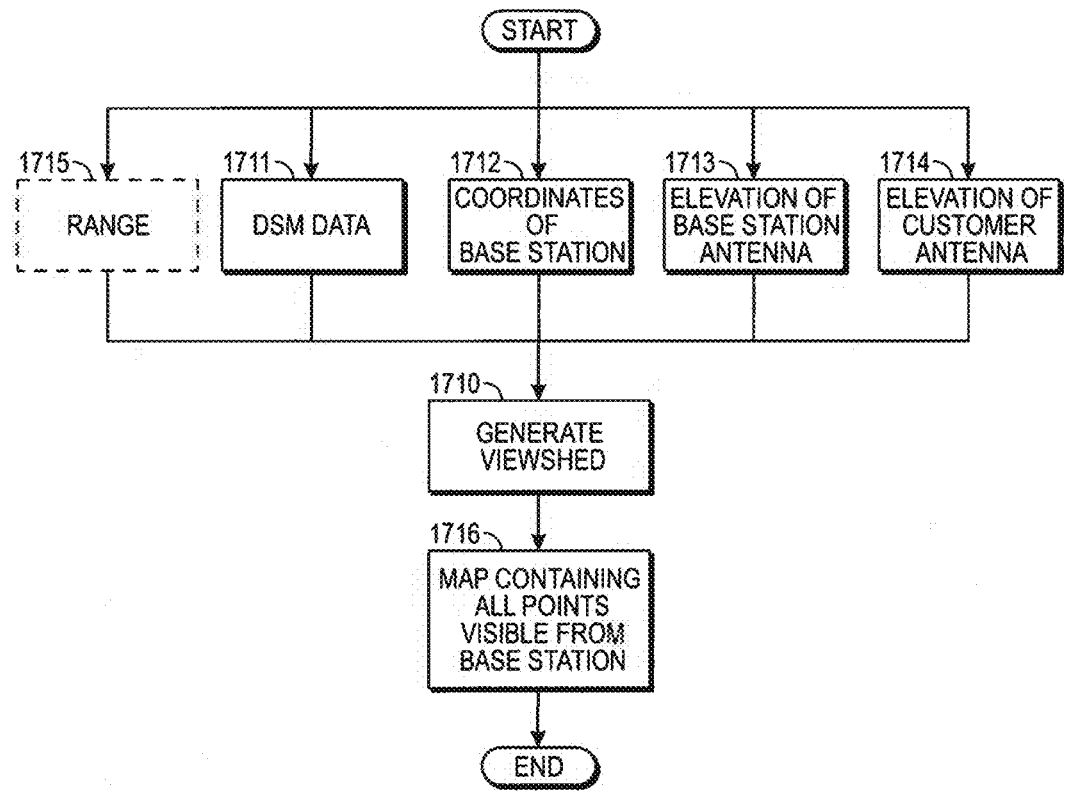
FIG. 17B is a flow chart illustrating aspects of an embodiment of the invention.

With regard to FIG. 17B, viewshed generation 1710 requires as input the DSM data at 1711. It also requires the two-dimensional coordinates of the base-station at 1712, and the height or elevation of the base-station antenna 1713. The height or elevation of customer antenna 1714 (relative to DSM data) is an optional parameter that may be input for viewshed generation. In one embodiment, the height of antenna 1713 or the height of antenna 1714 is relative to the structure (e.g., roof) on which it is mounted, or, in another embodiment, relative to some other point of reference, such as sea level. An additional, optional, parameter (reducing the required computation) that may be input is the range 1715, which limits the maximum distance for computing Line of Sight (LOS). The output of viewshed generation, according to one embodiment, is a map 1716 containing all points that are visible from the base-station that may or may not be limited by a maximum distance for LOS, according to the embodiment. In an alternative embodiment, the output can be other than a map, for example, a set of coordinate pairs defining polygons of areas that are visible from the base station, a raster file (e.g., 0/1 value for every pixel of the map to indicate if the corresponding coordinates are in the viewshed or not), or a vector file (e.g., a file containing polygon representations as a list of vectors, where the union of the polygons is equal to the viewshed).

Figure 11:
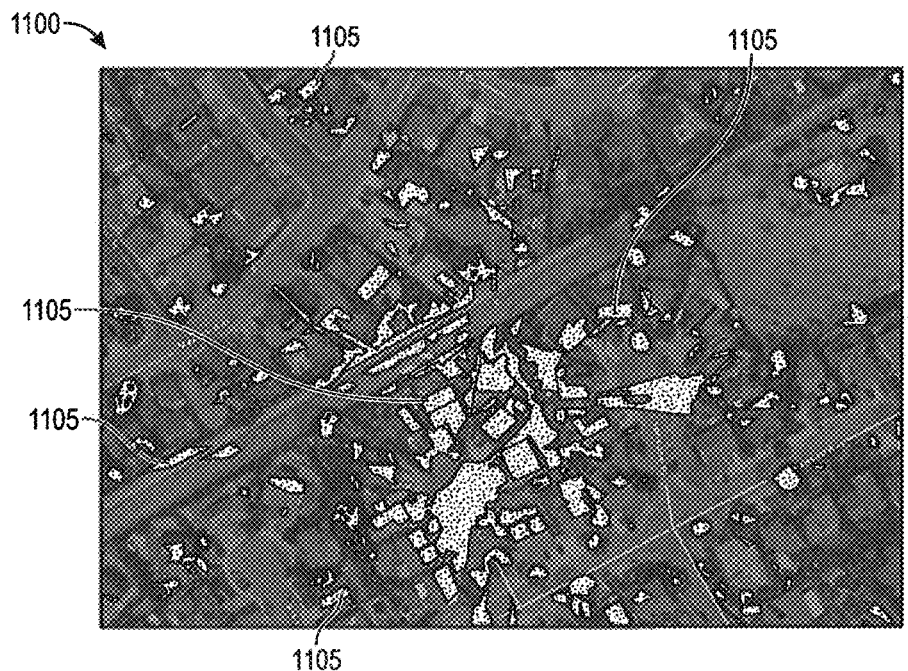
FIG. 11 provides an example of a generated viewshed, in accordance with an embodiment of the invention.

An example of a map of a generated viewshed is shown at 1100 in FIG. 11, where the areas 1105 indicate all points that are visible by a base-station at the location of the pin.

Viewshed computation is a relatively intensive process. For a map with n points (or cells), a brute-force algorithm requires $O(n^{(3/2)})$ LOS tests to be performed. The more sophisticated "sweep-line" algorithms requires $O^{(n*\log n)}$ tests. Some algorithm designs make use of GPU parallelization to significantly accelerate viewshed generation. See r.viewshed algorithm described at "grass.osgeo.org\\grass74\\manuals\V.viewshed.html", developed by Toma, L., Zhuang, Y., Richard, W., and Metz, M., and source code available at "trac.osgeo.org/grass/browser/grass/trunk/raster/r.viewshed"; and Fang, Chao & Yang, Chongjun & Chen, Zhuo & Yao, Xiaojing & Guo, Hantao (2011), *Parallel algorithm for viewshed analysis on a modern GPU*, Int. J. Digital Earth. 4. 471-486; and Heilmar, Christoph, *GPU-based visualisation of viewshed from roads or areas in a 3D environment*, Master of Science Thesis in Electrical Engineering, Linkoping University, Sweden, 2016, LiTH-ISY-EX-16/4951-SE (at liu.diva-portal.org/smash/get/diva2:954165/FULLTEXT01.pdf).

The viewshed is a very useful yet approximate method of estimating whether a signal can propagate without obstructions between a base-station antenna and a customer antenna. In practice, obstructions near the LOS path can further affect signal propagation. Objects near the LOS path will deflect a transmitted signal and its reflection may reach the receiver (whether in the downlink or uplink direction). Such reflected signals may combine constructively or destructively with the "direct" LOS signal, and result in a stronger or weaker received signal. The degree to which a reflected signal combines constructively or destructively with the direct signal depends on the phase of the reflected signal relative to the direct signal. For example, if the direct signal and a reflected signal of opposite phase combine at the receiver, the combined signal will be weaker than the direct signal on its own. The two (direct and reflected) signals may nearly cancel each other out if the distances they travel are similar.

Figure 12:
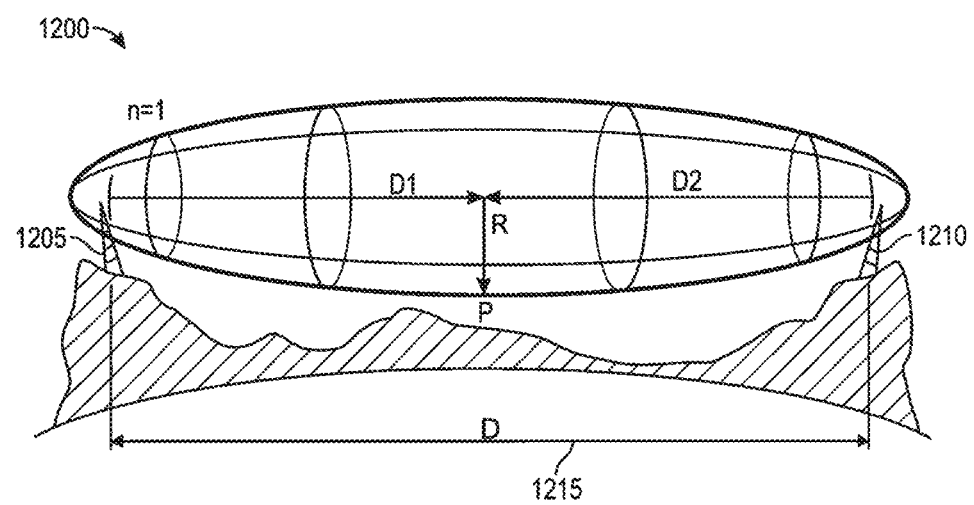
FIG. 12 is an example of a first Fresnel zone in accordance with an embodiment of the invention.

The concept of Fresnel zones captures the effect of obstacles near the LOS path on signal propagation. The first Fresnel zone is an ellipsoidal region of space surrounding the antennas of the wireless system. If a transmitted signal is reflected by an object on the boundary of the first Fresnel zone and continues on to the receiver, it undergoes a phase shift of half a wavelength. An example of a first Fresnel zone obtained from an illustration at //en.wikipedia.org/wiki/Fresnel_zone and shown at 1200 in FIG. 12, where the distance between the two antennas 1205 and 1210 is D, at 1215.

Objects within the first Fresnel zone can cause reflected signals with a certain risk of those signals having such phase at the receiver that the combined signal is attenuated. As a result, the first Fresnel zone should, ideally, be free of obstructions in wireless systems with LOS requirements. Various rules may be followed, for example where some degree of obstruction may be tolerated (e.g. 20%). Higher order Fresnel zones are defined based on the phase shift caused by an object on their outer boundaries: the second Fresnel zone corresponds to a phase shift of one wavelength, the third Fresnel zone corresponds to a phase shift of 1.5 wavelengths, etc.

The definition of viewshed can be extended, and the above described algorithms modified, to take into account Fresnel zones. In particular, one embodiment contemplates a modified "viewshed" generation algorithm that instead of LOS computes a "clear 1st Fresnel zone" or "X % clear 1st Fresnel zone". In the standard definition of viewshed, point C is assumed visible by point B if a straight line can be drawn between them without crossing any obstacle in the intervening three-dimensional space. In an extended definition of viewshed with application to fixed wireless systems, point C is defined as "visible" by point B if the first Fresnel zone (corresponding to antennas placed at points B and C, and with a certain assumed transmission) is free of any obstacles. Variations of this definition may require that the first Fresnel zone is obstructed by less than a certain threshold, or that higher-order Fresnel zones are (relatively) free of obstructions.

The definition of viewshed can also be extended to take into account the radiation pattern of the base-station antenna. "Sector" antennas have a radiation pattern in the horizontal plane that favors a certain range of angles. This behavior is in contrast to "omni-directional" antennas whose radiation pattern in the horizontal plane is essentially flat. The generated viewshed can take the antenna pattern into account and exclude from its illuminated areas those corresponding to angles where the radiation pattern is weak or falls below a threshold. This method can be applied to both the vertical and the horizontal planes.

Figure 13:
FIG. 13 is an example of intersection of a viewshed and roof areas for 3 single-family homes.
Figure 17C:
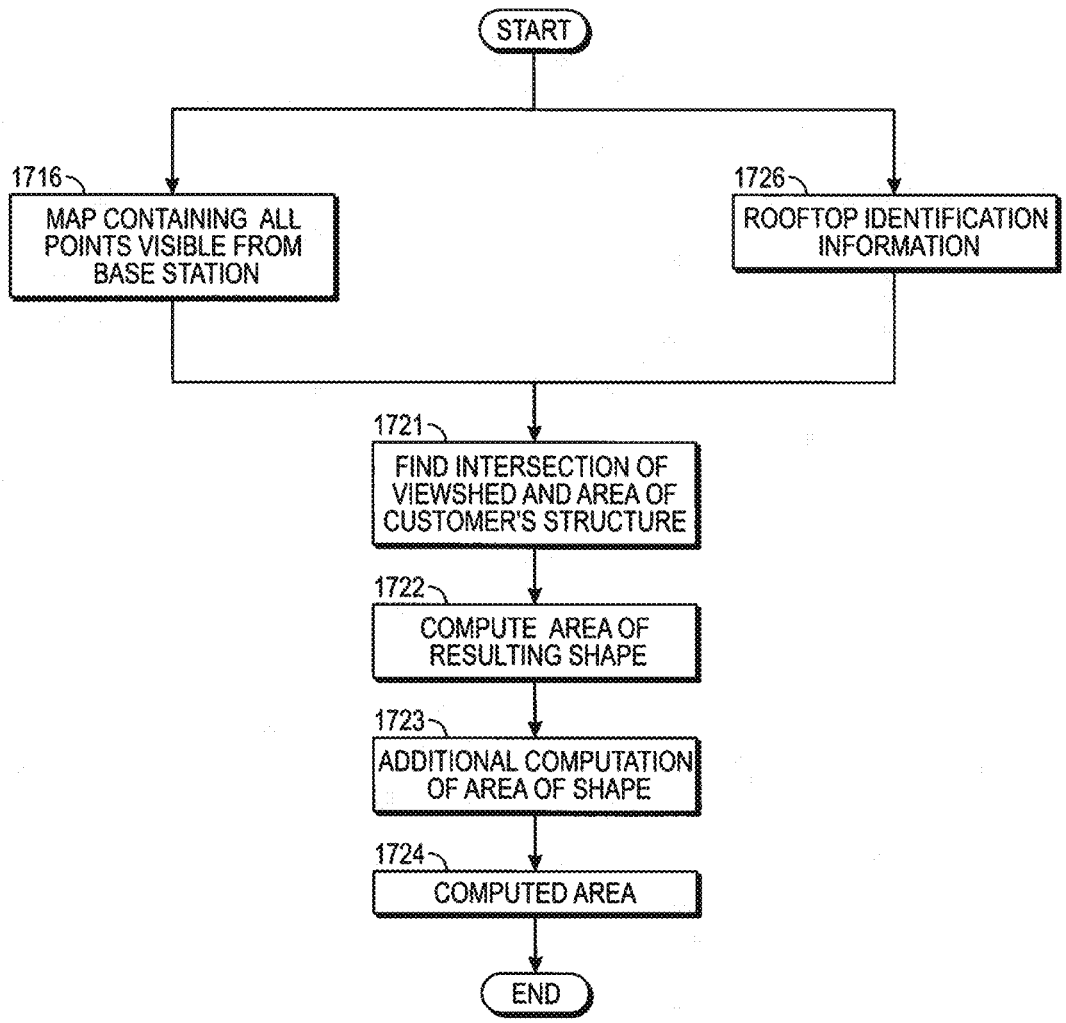
FIG. 17C is a flow chart illustrating aspects of an embodiment of the invention.

With reference to FIGS. 17A and 17C, the second step (at 1720) of customer qualification is computing the area of customer C's rooftop that is included in the generated viewshed. Step 1720 includes, in one embodiment, the steps 1721-1724 set forth in FIG. 17C. Step 1721 involves finding the intersection of the viewshed for the base-station and the relevant area of the customer's structure (e.g., the roof area of customer's building) based on input including the viewshed (i.e., a map containing all points visible from the base-station 1716), and rooftop identification information 1726, and then computing the area of the resulting shape at step 1722. This resulting shape can be non-compact (may contain "holes") and non-connected or dis-contiguous (may consist of "islands"). See FIG. 13 for an example of the intersections 1305 of viewshed and roof areas for 3 single-family homes at 1300. Additional processing of the geographical data is possible to improve the algorithm accuracy, at step 1723. A first example of such processing is to reduce or shrink the shape resulting from the intersection operation to produce a more conservative estimate of the illuminated area (as performed, according to one embodiment, by the v.buffer function of GRASS with a negative "buffer" value). A second example is to eliminate small islands or dis-contiguous elements or regions of the resulting shape, so that such islands, elements, or regions do not count toward the estimated area of the shape. In one embodiment, step 1723 may be performed after computing the area of the resulting shape at step 1722. In another embodiment, these steps may be performed in reverse order.

Figure 17D:
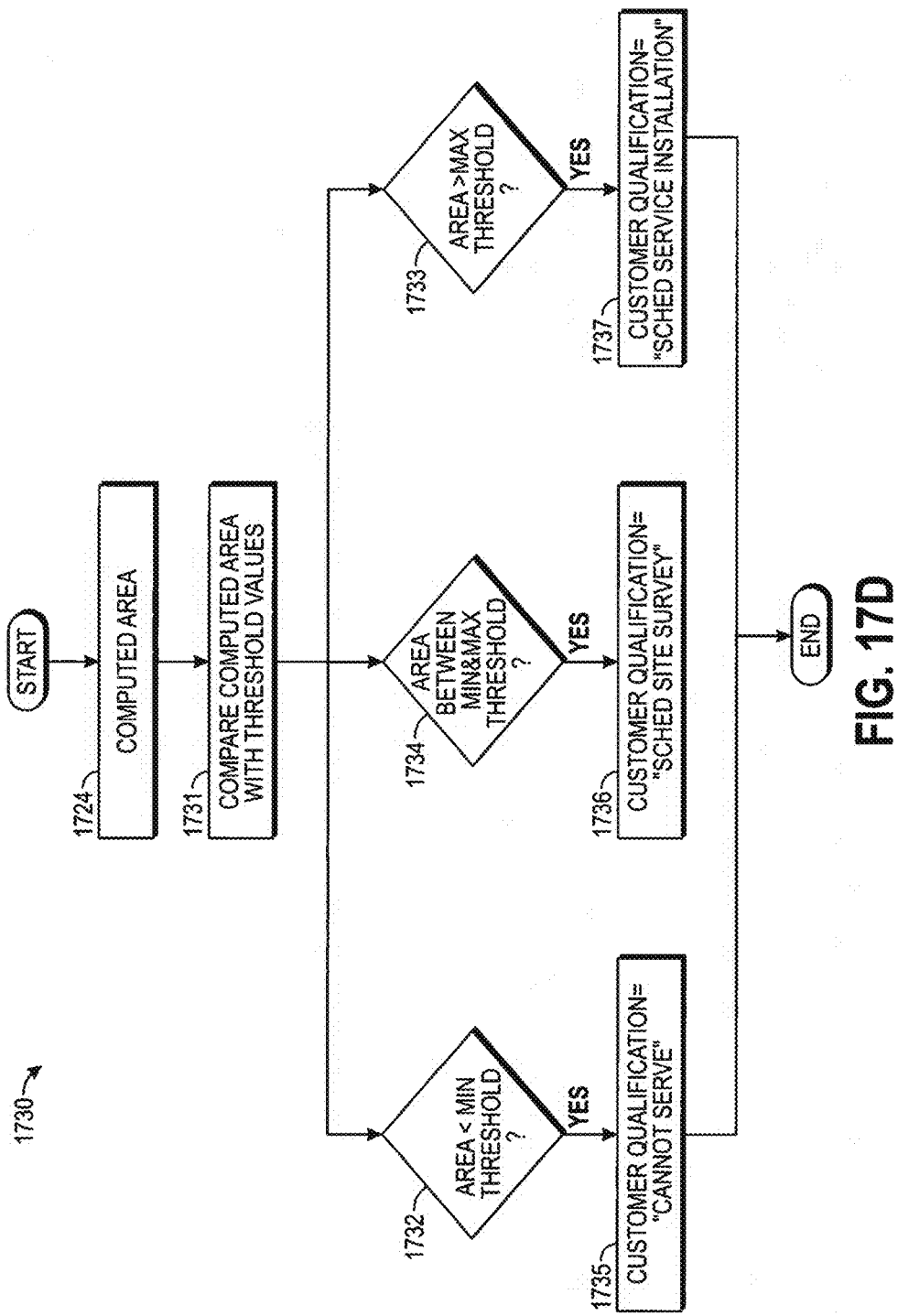
FIG. 17D is a flow chart illustrating aspects of an embodiment of the invention.

With reference to FIGS. 17A and 17D, the final step 1730 of customer qualification is to produce the customer qualification result based on computed area. One method to produce this result, according to one embodiment, is to compare the computed area with certain threshold values at step 1731. If the computed area is below a first threshold (e.g. 5 square meters) at 1732, then the customer qualification result is a recommendation at step 1735 such as "cannot serve". If the computed area is above a second threshold (e.g. 20 square meters) at 1733, then the result is a recommendation at step 1737 to "schedule service installation". If the computed area has a value between the two thresholds at 1734, then the result is a recommendation at step 1736 to "schedule site survey". For the latter case, the purpose of the site survey might be to provide a more definite answer as to whether the customer can be served or not.

Further criteria and more complex logic can be added to step 1730. One additional criterion is to check the distance between the base-station and the roof area, and to disqualify (recommend as "cannot serve") those customers with a distance exceeding a certain threshold. This check can be made dependent on the type of installed base-station or on the type of planned customer-side radio. A more complex logic is to make the thresholds used for comparing areas at step 1731 dependent on the distance between the base-station and the roof area. Another embodiment contemplates making these area thresholds dependent on the type of the installed base-station or on the type of planned customer-side radio.

The customer qualification result can have multiple fields of information. It typically contains a recommendation such as "install", "survey", "cannot serve" as explained above. It may also include information about areas identified for antenna installation or about one or more preferred locations for such installation, e.g. "mount antenna at coordinates (X,Y); chimney". It may provide data, such as the computed area of the viewshed-illuminated part of the roof, the distance between the base-station and the customer-side antenna location, the compass bearing for aligning the customer-side antenna to the base-station, estimated antenna tilt angle, expected received signal strength and expected transmission speeds.

The customer qualification method can be used in various modes. A first mode is to execute a check of whether a specified base-station B can serve a specified customer C.

A second mode is to execute a check of whether any base-station (among a set of installed base-stations $B\_1$, $B\_2, \ldots, Bn$) can serve a specific customer C. A standard implementation of this second mode is to iterate over base-stations $B\_1, B\_2, \ldots, B\_n$ and to invoke for each iteration the customer qualification method as defined in the first mode. This case produces a separate qualification result for each base-station. Using the individual qualification results for each base-station, one can then produce a combined qualification result. For example, if base-station $B\_2$'s viewshed illuminates the largest roof-top area of customer C among all base-stations, the combined qualification result can be "Proceed with service installation using base-station $B\_2$".

A third mode is to execute a search for all customers (corresponding to locations or parcels within a defined region) that can be served by a specific base-station B. An implementation of this third mode may start with the viewshed generation for base-station B and proceed with the computation of the viewshed-illuminated roof area for each of the customer locations. The customer qualification result is then produced for each customer individually based on this computed area.

A fourth mode is to produce customer qualification results for all customers and against all base-stations within a defined region. The implementation of this mode can include iteration over all installed base-stations. For each iteration the viewshed is generated for the corresponding base-station, the viewshed-illuminated roof area is computed for each and every customer location, and the customer qualification result is produced for each and every customer location and the corresponding base-station. A combined customer qualification result may additionally be produced similarly to what was described above for the second mode.

In summary, the steps for an embodiment of customer qualification are as follows, keeping in mind that not all steps are necessary in all embodiments:
1. Generate viewshed of base-station B at step 1710;
2. Produce intersection of base-station viewshed and identified roof areas at step 1721;
3. Process intersection (e.g., eliminate small "islands", shrink individual areas) at step 1723; and
4. Find all parcels P (i.e., customer locations) that overlap with the intersection produced and processed at steps 1721, 1723;
5. Estimate area of intersection within a parcel P at step 1722, and output the estimated (computed) area 1724;
6. If estimated area 1724 is determined at step 1731 is below a first threshold T1 at step 1732, store a result that indicates the fixed wireless communication system "Cannot serve parcel P from base-station B" at step 1735;
7. If estimated area 1724 is above a second threshold T2 at 1733, store the result that indicates the system "Can install service to parcel P from base-station B" at step 1737;
8. If estimated area 1724 is between thresholds T1 and T2 at 1734, store the result that indicates the system needs to "schedule a site survey to decide if parcel P can be served from base-station B" at step 1736;
9. Is there another parcel that overlaps with intersection? If Yes, go to 5 (step 1722), if No, go to 10 (next step);
10. Is there another base-station in the region? If Yes, go to 1 (step 1710), if No, then end.

Network Design

Embodiments of the network design method described below evaluate and rank candidate locations for installing new base-stations providing for fixed wireless communications with customers. The embodiments use objective metrics to estimate the attractiveness of each location, and are capable of producing candidate "designs" that include multiple base-stations to serve customers in a target area.

An initial requirement for the network design method is to identify a target area to serve. Marketing data such as demographics, information about competitors, and expressed interest by potential customers can be factors in such a decision. Other considerations such as availability of internet backbone connections, regulatory criteria, terrain, building density and vegetation density can be additional factors.

The fundamental steps of network design, according to one embodiment of the invention, are as follows:
1. Evaluate each candidate location for installing a new base-station; and
2. Produce ranking of evaluated candidate locations.

Evaluation of Candidate Locations for Installing a New Base-Station

Any parcel of land can be a candidate location for installing a new base-station. For the purpose of building a fixed wireless network in a suburban or urban environment, parcels containing buildings are preferable in that the building provides good options for installing one or more base-station antennas at a good height without requiring new construction. The method described herein according to one embodiment identifies base-station candidate locations based on the parcel where the base-station may be installed.

It is desirable for a new base-station to be able to serve many potential customers, or even better, to serve customers that have already expressed an interest in being served. Fixed wireless customers can be identified based on the parcel of their residence or business.

Each base-station is characterized by the customer locations that it can serve. These locations are determined by the viewshed of the base-station, and a list of such locations can be produced using the methodologies explained above in connection with the description of the customer qualification process (e.g., see third mode of customer qualification method producing all customers that can be served by a specific base-station).

A convenient way to represent a viewshed of a base-station is as a vector with elements corresponding to all customer locations in the target area. An element of the viewshed vector of a base-station is 1 if the corresponding location can be served. Otherwise, the element is 0. According to an embodiment, the viewshed vector need not have only elements of 0 and 1. The elements of the viewshed vector can be weighting factors of the customer locations. One example is for such a weight to represent the expected number of customers (or expected amount of revenue) from the customer location. If the location is outside the viewshed, the weight shall be zero. If the location is in the viewshed and there is one customer that has expressed interest in the service, the weight may be 0.8 (i.e. 80% probability). If the location is in the viewshed and there is one customer with no expressed interest, the weight may be 0.4. If there were 2 potential customers at that location, the weight would change to 2×0.4=0.8, and so on.

An equivalent yet condensed representation of the viewshed vector of a base-station is as a list of parcel identifiers (or similarly unique identifiers) corresponding to customer locations within the viewshed.

A few examples to illustrate the concept of a viewshed vector for a simple case of 8 customer locations are provided below. The viewshed vector of an example base-station can be:

[1 0 1 1 0 0 0 0]

Each element of this vector indicates if a customer location can be served or not. In this example, locations 1, 3 and 4 can be served, but locations 2, 5, 6, 7, and 8 cannot be served. The equivalent list representation is [1 3 4]. A weighted viewshed vector (e.g. taking into account customer sign-ups, or customers living in a duplex) can be:

[0.4 0 1.6 0.8 0 0 0 0]

In this case, there is one customer in location 1 who has not expressed interest in the service; there are two customers in location 3 who have expressed interest; and one customer in location 4 who has expressed interest. The equivalent list representation is [1 3 4] as before, but a separate table is needed to store the weights of each customer location.

The viewshed vector can be defined to take into account or to ignore the effect of existing base-stations. If existing base-stations are already serving customers 1 and 4, the above viewshed vector becomes:

[0 0 1 0 0 0 0 0] (or equivalently [3])

There are many possible positions in a candidate parcel for installing a base-station antenna. This raises the question of how to select the position within the parcel for computing the viewshed vector representing the candidate location of the base-station. There are many ways to choose the base-station position:

Select the median point of the parcel
Select the median point of the roof area within the parcel
Select the highest point of the roof area within the parcel
Select a preferable point (e.g. chimney) on the roof area within the parcel
Evaluate the viewshed vector for multiple points of the roof area within the parcel and select the point that maximizes a metric derived from the viewshed vector (an example method of selecting points of or within the parcel is from a grid; an example metric derived from the viewshed vector is a sum of the vector elements).

Figure 18A:
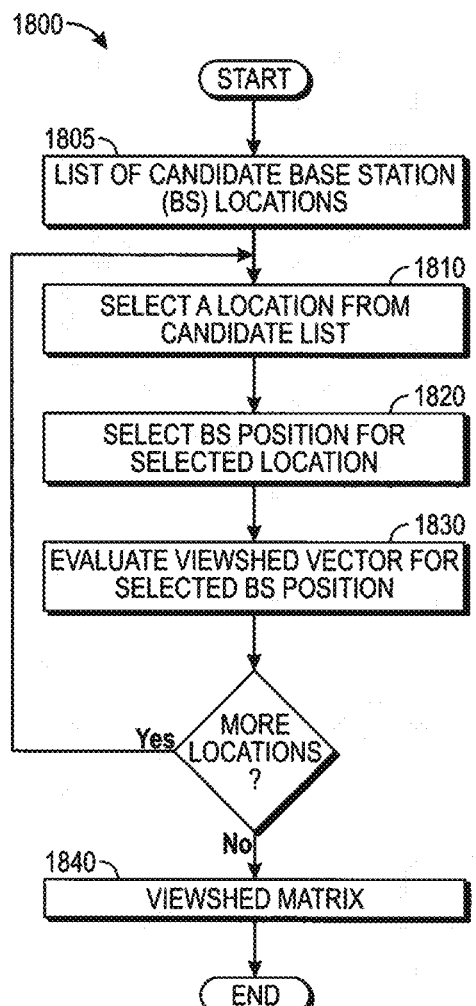
FIG. 18A is a flow chart illustrating aspects of an embodiment of the invention.

The steps for evaluating candidate base-station locations, according to an embodiment 1800 of the invention, are as follows, with reference to FIG. 18A:
1. Given a list of candidate base station locations input at 1805, select a location from the list of candidate base station locations at step 1810;
2. Select a base-station position for the location selected in step 1820;
3. Evaluate at step 1830 a viewshed vector for the base-station position selected in step 1820; and
4. If more candidate locations to evaluate, go to step 1810, otherwise output a viewshed matrix at step 1840, and end.

Regarding step 1820, the selection of a location involves a sequential search thru the entire list of candidate locations. In one embodiment, the process at 1820 involves iterating over each and every parcel of land (i.e., candidate base-station "locations") to choose or find the best position for putting an antenna at that (i.e., inside or within the) location, for example, where exactly on the roof should one assume that the base-station antenna will be placed. When parcel data from a certain area are used for building the list of candidate locations, techniques can be applied to limit the size of the list. One such technique is to exclude from the list those parcels that do not contain buildings (e.g., whose land-use field is "park") or those parcels that contain buildings below a certain height. Another technique would be to exclude those parcels whose owners have previously indicated they are not interested in having a base-station on their property (this field could time out or age such that a parcel is not excluded if the indication of non-interest is greater than a certain period of time, say, one year). According to one embodiment, the list of candidate locations may be limited to only those that are most favorable to being selected as new base-stations, for example, based on user input or other configurable input. According to another embodiment, with reference to FIG. 19, steps 1905 and 1910 (described below), the list of candidate locations can also be limited based on an evaluation of their viewshed vector. If the number of potential customer locations or the expected number of customers (derived by the viewshed vector) falls below a defined vector, the candidate location is eliminated. In another embodiment, e.g., to minimize iterations, e.g., after evaluating multiple locations and obtaining significant/satisfactory base-station coverage for geographic region, a decision may be made to not process further/remaining candidate locations.

Similar filtering techniques can be applied for parcels corresponding to customer locations. Parcels corresponding to non-occupied plots of land (e.g. empty space) can be excluded. Parcels corresponding to currently served customers may also be excluded. (An alternative approach to entirely excluding current customers is to assign a very small weight to them.) It is evident from the above description that the set of parcels used for the list of candidate locations for base-stations may partially overlap but may not match the set of parcels corresponding to the customer locations.

The output of this evaluation process can be represented as a viewshed matrix 1840 consisting of rows corresponding to candidate base-station locations and columns corresponding to potential customer locations. Each row of the viewshed matrix is equal to the viewshed vector of the corresponding relay site/base-station location. An example viewshed matrix with 4 base-station locations (A, B, C and D), 8 customer locations, and with only weights of 0 (cannot serve) and 1 (can serve) is shown below:

|   | 1 | 2 | 3 | 4 | 5 | 6 | 7 | 8 |
|---|---|---|---|---|---|---|---|---|
| A | 1 | 0 | 1 | 1 | 0 | 0 | 0 | 0 |
| B | 0 | 1 | 1 | 1 | 0 | 0 | 1 | 0 |
| C | 1 | 0 | 0 | 1 | 1 | 1 | 0 | 0 |
| D | 1 | 1 | 1 | 0 | 0 | 0 | 0 | 0 |

An alternative to the viewshed matrix is a list representation as shown below:

| | |
|---|---|
| A | [1 3 4] |
| B | [2 3 4 7] |
| C | [1 4 5 6] |
| D | [1 2 3] |

Figure 18B:
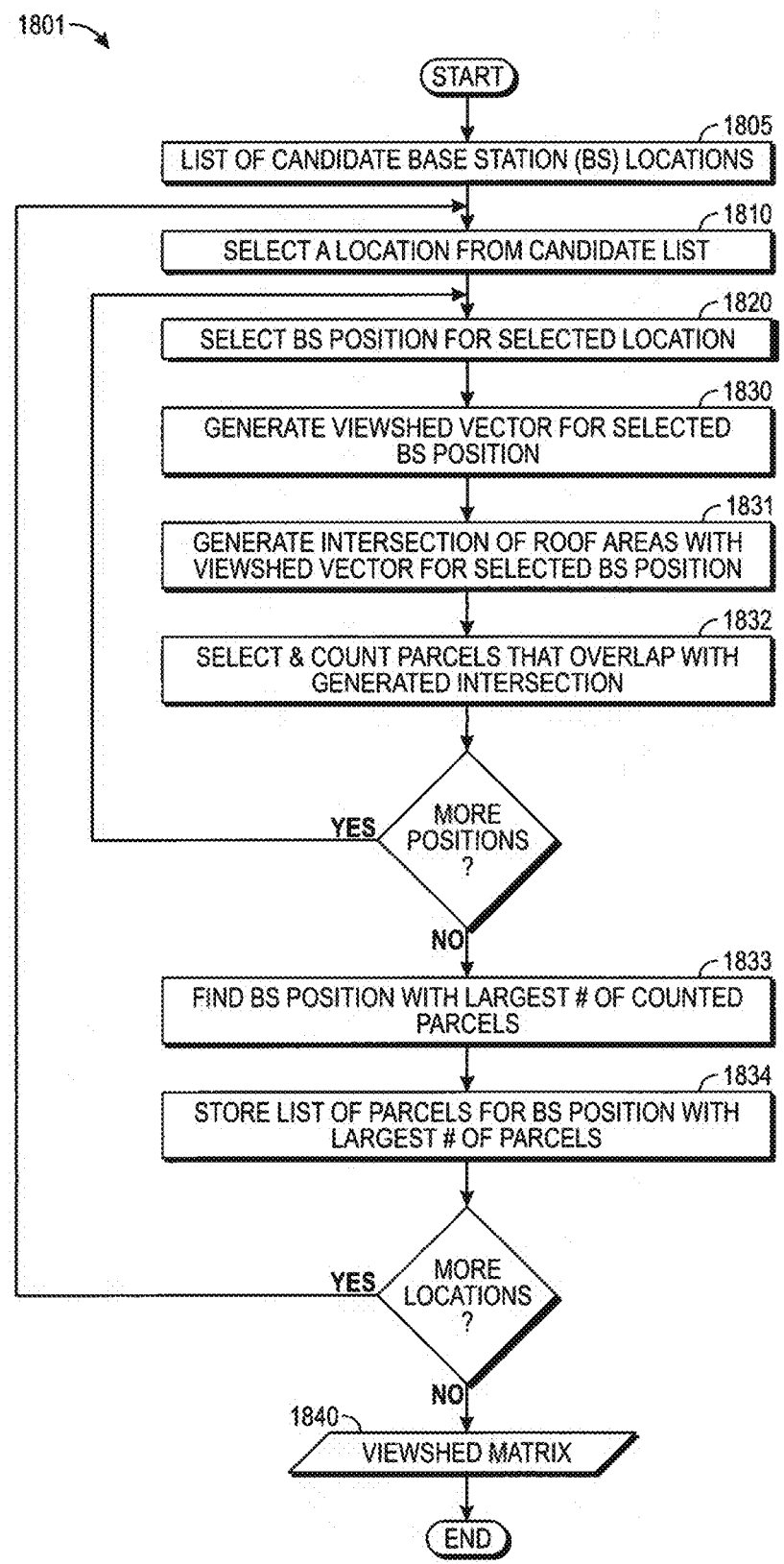
FIG. 18B is a flow chart illustrating aspects of an embodiment of the invention.

In one embodiment 1801, with reference to FIG. 18B, the steps for evaluating candidate base-station locations are as follows:
1. Select a location at step 1810 from list of candidate locations 1805;
2. Select at step 1820 a base-station position on a roof of the location selected in step 1810;
3. Generate at step 1830 a viewshed map for the base-station position selected in step 1820;
4. Produce at step 1831 an intersection of roof areas obtained from a roof identification map with the viewshed map generated in step 1830, essentially generating a "roof limited" viewshed;
5. Select at step 1832 parcels that have overlap with the intersection produced in step 1831 and count the selected parcels;
6. Return to step 1820 if more base-station positions on the roof of the selected location to evaluate; if not, go on to next step;
8. Find at step 1833, for the selected location, the base-station position with the largest number of parcels counted in step 1832;
9. Store, at step 1834, the list of parcels corresponding to viewshed of the base-station position found to have the largest number of parcels in step 1832; and
10. Return to step 1810 if more candidate locations to consider, otherwise, output a viewshed matrix 1840, and end.

Ranking of Evaluated Candidate Locations

The evaluation of candidate locations for installing new base-stations produces a viewshed matrix 1840 (or an equivalent representation). The viewshed matrix is next used to rank the candidate locations.

In one embodiment, the objective of the ranking is to find one location to expand the existing network by one base-station. In other embodiments, the objective is to identify multiple locations to expand the existing network by a specific number of base-stations. The processes for both embodiments are described below.

An important constraint for ranking candidate locations for base-stations is the ability of each location to connect to the service provider's network (backhaul). A good way to take this constraint into account is to exclude from such ranking those locations that have no viable backhaul solution.

Figure 19:
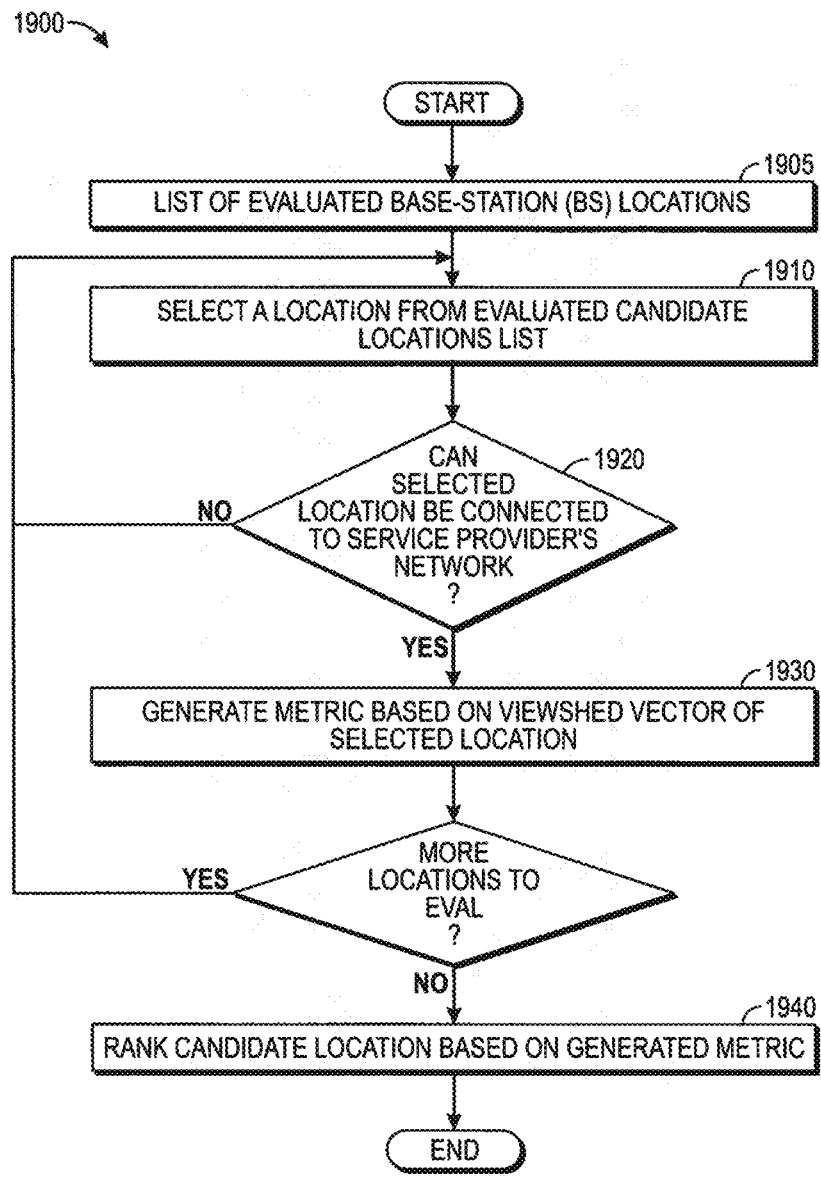
FIG. 19 is a flow chart illustrating aspects of an embodiment of the invention.

When the objective is to expand the existing network by one base-station, the fundamental steps of ranking the evaluated candidate base-station locations, according to an embodiment 1900, are as follows, with reference to FIG. 19:
1. Given a list of evaluated candidate base-station locations input at 1905, select a location from list of evaluated candidate base-station locations at 1910;
2. Check at step 1920 if the location selected in step 1910 can be connected to the service provider's network. If Yes, go to step 1930; if No, go to step 1910;
3. Produce at step 1930 a metric based on the viewshed vector of the location selected in step 1920;
4. If there are more candidate locations to evaluate, go to step 1910, otherwise, go on to the next step 1940;
5. Rank at step 1940 the candidate location based on the metric produced in step 1930, and end.

The connectivity check of step 1920 is explained further below.

One metric based on the viewshed vector that is used in one embodiment is the sum of the elements of the viewshed vector. If these elements are a binary representation of whether the corresponding customer can be served or not, then the metric equals the number of customer locations that are visible by the base-station at the candidate location. If these elements are the expected number of customers at this location, then the metric equals the aggregate expected number of customers that can be served at all locations visible by the base-station.

When the objective is to expand the existing network by a specific number of base-stations, then the ranking applies to a set of candidate base-station locations, and the metric is based on a combined viewshed vector of these base-stations. This is next explained with an example.

A viewshed matrix with 4 relay sites/base-station candidate locations and 8 customer locations is as shown below:

|   | 1 | 2 | 3 | 4 | 5 | 6 | 7 | 8 |
|---|---|---|---|---|---|---|---|---|
| A | 1 | 0 | 1 | 1 | 0 | 0 | 0 | 0 |
| B | 0 | 1 | 1 | 1 | 0 | 0 | 1 | 0 |
| C | 1 | 0 | 0 | 1 | 1 | 1 | 0 | 0 |
| D | 1 | 1 | 1 | 0 | 0 | 0 | 0 | 0 |

This matrix shows, for example, that location 1 can be served by any of relays A, C or D; location 7 can only be served by relay B; and location 8 cannot be served by any relay.

Consider the case, where the goal of network expansion is to select two new base-stations (among the possible base stations A, B, C and D in the above matrix) to install or add to the existing fixed-wireless communication network. The viewshed matrix can be used to derive the combined viewshed matrix of multiple base-stations. One method to obtain this combined viewshed is by applying a Boolean OR operation element-wise to the corresponding viewshed vectors. For n relay sites (possible base-station locations) and selecting k relay sites among those n relay sites for combining, the combined viewshed matrix has "n choose k" rows, according to the mathematical operation for computing a Binomial coefficient. Continuing the previous example, when combining 2 base-stations at a time, the combined viewshed matrix is as follows:

|       | 1 | 2 | 3 | 4 | 5 | 6 | 7 | 8 |
|-------|---|---|---|---|---|---|---|---|
| A + B | 1 | 1 | 1 | 1 | 0 | 0 | 1 | 0 |
| A + C | 1 | 0 | 1 | 1 | 1 | 1 | 0 | 0 |
| A + D | 1 | 1 | 1 | 1 | 0 | 0 | 0 | 0 |
| B + C | 1 | 1 | 1 | 1 | 1 | 1 | 1 | 0 |
| B + D | 1 | 1 | 1 | 1 | 0 | 0 | 1 | 0 |
| C + D | 1 | 1 | 1 | 1 | 1 | 1 | 0 | 0 |

This example shows that there are 6 groups each consisting of two candidate base-stations that need to be ranked. Each of the 6 groups has a combined viewshed vector on which a metric can be computed for the purpose of ranking the 6 groups.

Figure 20:
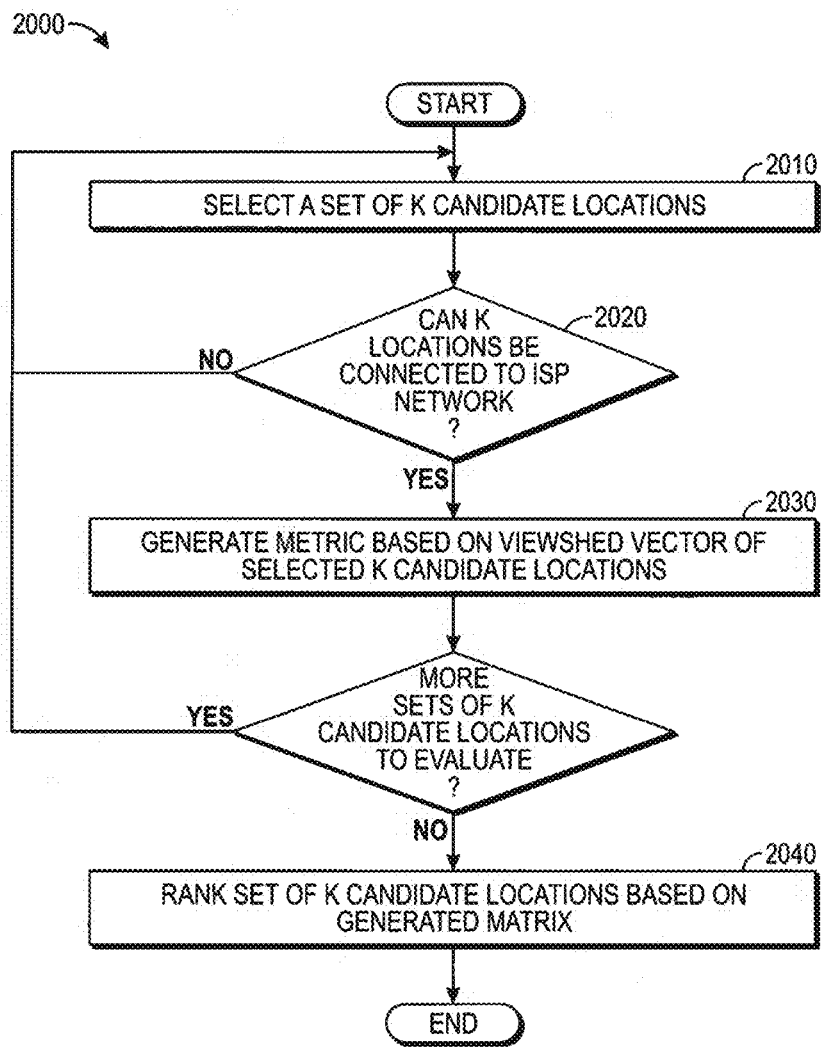
FIG. 20 is a flow chart illustrating aspects of an embodiment of the invention.

For an embodiment 2000 that expands the existing network by k of n base-stations, the fundamental steps of ranking the evaluated sets of candidate locations are as follows, with reference to FIG. 20:
1. Select set of k candidate locations at step 2010;
2. Check at step 2020 if the k locations selected in step 2010 can be connected to the service provider's network; if Yes, go to step 2030; if No, go to step 2010;
3. Generate at step 2030 a metric based on the viewshed vector of the k candidate locations selected in step 2020;
4. If there are more sets of k candidate locations to evaluate, go to step 2010; if not, go to step 2040; and
5. Rank at step 2040 the sets of k candidate locations based on the metric produced in step 2030, and end.

Metrics based on the viewshed vector of one candidate location can also be used as metrics for the viewshed vector of a set of multiple candidate locations.

When having to rank sets of candidate locations, one complication is that the number of sets to rank can increase very rapidly. The table that follows illustrates this problem with a few examples:

|           | All candidate locations (n) | New base-stations (k) | Total number of combinations to rank (n choose k) |
|-----------|-----------------------------|------------------------|---------------------------------------------------|
| Example 1 | 200 | 5 | 2.535e9 |
| Example 2 | 100 | 5 | 75.288e6 |
| Example 3 | 200 | 3 | 1.313e6 |
| Example 4 | 102 | 3 | 171,700 |
| Example 5 | 100 | 2 | 4,950 |
| Example 6 | 60  | 2 | 1,770 |

For this reason, according to one embodiment, there is an additional step to limit the number of candidate locations to only those that are most favorable to being selected as new base-stations. For example, candidate locations can be excluded if they do not meet a minimum roof height requirement, or if a backhaul connection to the rest of the network is not feasible.

Candidate locations can also be limited based on an evaluation of their viewshed vector. If the number of potential customer locations or the expected number of customers (derived by the viewshed vector) falls below a defined vector, the candidate location is eliminated.

Checking for Connectivity

As described earlier, filtering can be applied to candidate locations or to sets of candidate locations to eliminate those that cannot be connected to the service provider's network. Each candidate location (or each set of candidate locations) can be assigned a connectivity metric. If this connectivity metric falls below a defined threshold, then the candidate location (or the set of candidate locations) is excluded from further consideration.

At its simplest, according to an embodiment, the connectivity metric can equal 1 when connectivity is possible, and 0 when connectivity is not possible. More complex connectivity metrics suitable for this application can be derived using the concepts of vertex-connectivity and edge-connectivity from graph theory. Base-stations are to be represented as vertices of a graph. An edge between two vertices is drawn if the corresponding base-stations can be connected. In the (most common) case of wireless backhaul, that is determined by the existence of an LOS path between the two locations. (The concept of a viewshed matrix can also be applied to evaluate such backhaul connectivity.) An example graph 1400 is shown in FIG. 14.

Figure 14:
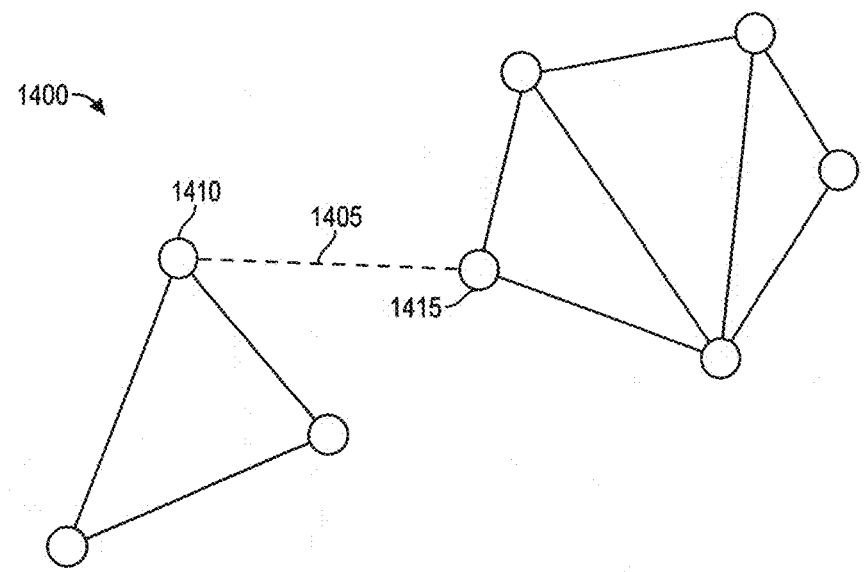
FIG. 14 illustrates a graph as may be used in embodiments of the invention to implement connectivity metrics.

In this example graph illustrated in FIG. 14, we see a single dashed edge 1405 connecting two vertices 1410 and 1415. If this edge is removed, the graph becomes disconnected. For a base-station network corresponding to this graph, this means that the corresponding link failure would make the two parts of the network unable to communicate with each other.

Edge-connectivity between two vertices of a graph is the size of the smallest edge cut disconnecting the two vertices. Edge-connectivity of the graph is the size of the smallest edge cut that renders the graph disconnected. For the previous example, the edge-connectivity of the graph is 1.

Figure 15:
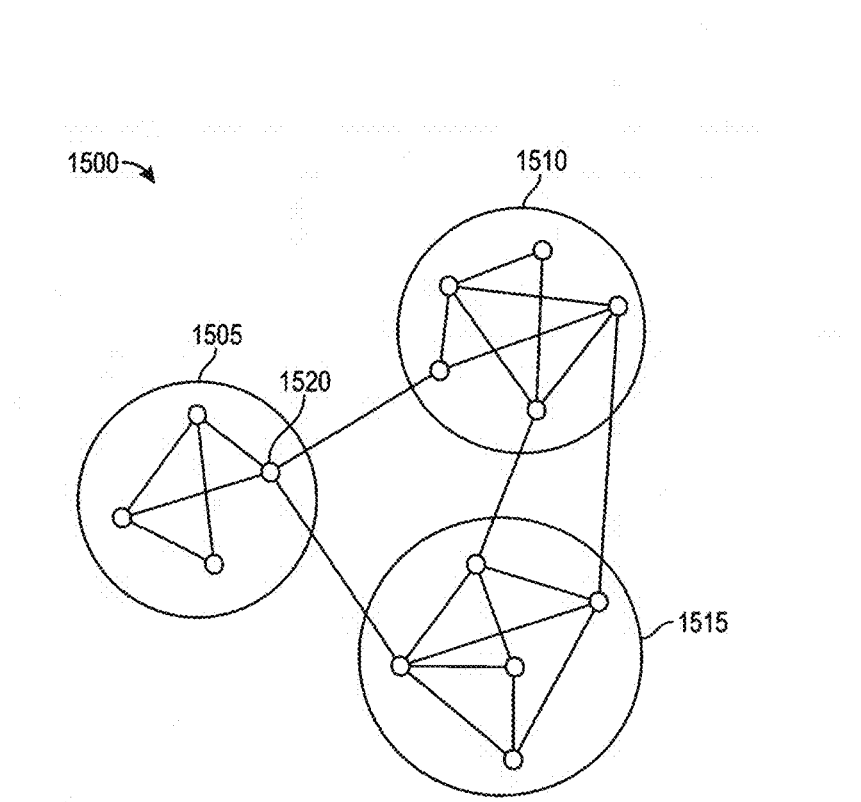
FIG. 15 illustrates an example of vertex-connectivity as may be used in embodiments of the invention to implement connectivity metrics.

FIG. 15 illustrates a second example to illustrate vertex-connectivity. The graph 1500 in FIG. 15 becomes disconnected when node 1520 in the area 1505 defining a first sub-network is removed. For the corresponding relay network, this means that a power or other failure at the corresponding relay site would make the first sub-network in the area 1520 unable to communicate with the second and third sub-networks defined by the respective areas 1510 and 1515.

Vertex-connectivity between two vertices of a graph is the size of the smallest vertex cut disconnecting the two vertices. Vertex-connectivity of a graph is the size of the smallest vertex cut making the graph disconnected. For the previous example, the vertex-connectivity of the graph is 1.

When applied to base-stations in a wireless network, the edge-connectivity between a candidate base-station and an existing relay node corresponds to the minimum number of backhaul link failures that would cause the candidate base-station to become unreachable. The vertex-connectivity between a candidate base-station and an existing relay node corresponds to the minimum number of node failures that would cause the candidate base-station to become unreachable. The minimum of vertex-connectivity over all candidate base-stations in a set is a very good measure of resiliency for this candidate set. The minimum of edge-connectivity over all candidate base-stations in a set is a second resiliency measure that can be used.

Computing vertex-connectivity and edge-connectivity on graphs are well-studied problems. Both problems can be solved using the principles of the max-flow-min-cut-set theorem, and using algorithms such as Ford-Fulkerson.

Computing Environment

Figure 16:
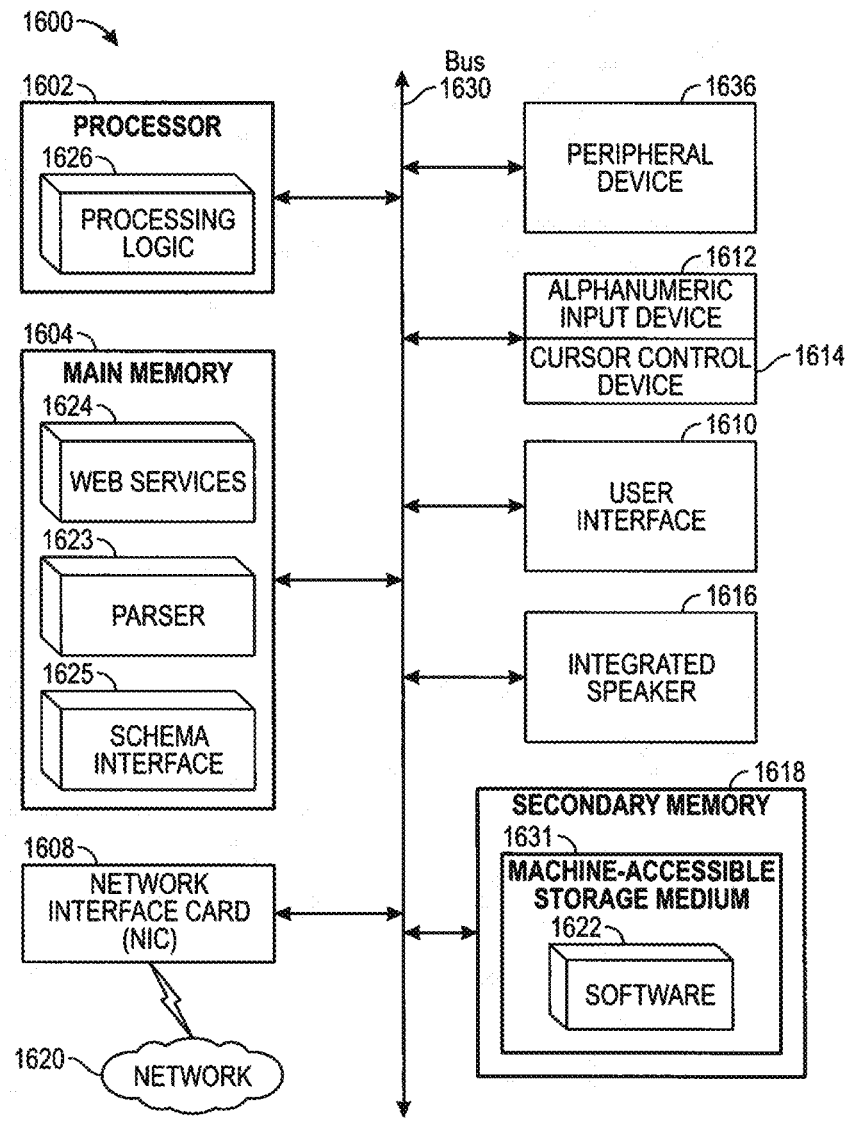
FIG. 16 illustrates a diagrammatic representation of a machine in the exemplary form of a computer system, in accordance with one embodiment of the invention.

FIG. 16 illustrates a diagrammatic representation of a machine 1600 in the exemplary form of a computer system, in accordance with one embodiment, within which a set of instructions, for causing the machine 1600 to perform any one or more of the methodologies discussed herein, may be executed. In alternative embodiments, the machine may be connected, networked, interfaced, etc., with other machines in a Local Area Network (LAN), a Wide Area Network, an intranet, an extranet, or the Internet. The machine may operate in the capacity of a server or a client machine in a client-server network environment, or as a peer machine in a peer to peer (or distributed) network environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1600 includes a processor 1602, a main memory 1604 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), etc.), and a secondary memory 1618, which communicate with each other via a bus 1630. Main memory 1604 includes information and instructions and software program components necessary for performing and executing the functions with respect to the various embodiments of the systems, methods for implementing embodiments of the invention described herein. Instructions 1623 may be stored within main memory 1604. Main memory 1604 and its sub-elements are operable in conjunction with processing logic 1626 and/or software 1622 and processor 1602 to perform the methodologies discussed herein.

Processor 1602 represents one or more general-purpose processing devices such as a microprocessor, central processing unit, or the like. More particularly, the processor 1602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1602 may also be one or more special-purpose processing devices such as an application specific integrated circuit (ASIC), a field programmable gate array (FPGA), a digital signal processor (DSP), network processor, or the like. Processor 1602 is configured to execute the processing logic 1626 for performing the operations and functionality which are discussed herein.

The computer system 1600 may further include one or more network interface cards 1608 to interface with the computer system 1600 with one or more networks 1620. The computer system 1600 also may include a user interface 1610 (such as a video display unit, a liquid crystal display (LCD), or a cathode ray tube (CRT)), an alphanumeric input device 1612 (e.g., a keyboard), a cursor control device 1614 (e.g., a mouse), and a signal generation device 1616 (e.g., an integrated speaker). The computer system 1600 may further include peripheral device 1636 (e.g., wireless or wired communication devices, memory devices, storage devices, audio processing devices, video processing devices, etc.).

The secondary memory 1618 may include a non-transitory machine-readable storage medium (or more specifically a non-transitory machine-accessible storage medium) 1631 on which is stored one or more sets of instructions (e.g., software 1622) embodying any one or more of the methodologies or functions described herein. Software 1622 may also reside, or alternatively reside within main memory 1604, and may further reside completely or at least partially within the processor 1602 during execution thereof by the computer system 1600, the main memory 1604 and the processor 1602 also constituting machine-readable storage media. The software 1622 may further be transmitted or received over a network 1620 via the network interface card 1608.

Some portions of this detailed description are presented in terms of algorithms and representations of operations on data within a computer memory. These algorithmic descriptions and representations are the means used by those skilled in the data processing arts to most effectively convey the substance of their work to others skilled in the art. An algorithm is here, and generally, conceived to be a sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from this discussion, it is appreciated that throughout the description, discussions utilizing terms such as "processing" or "computing" or "calculating" or "determining" or "displaying" or the like, refer to the action and processes of a computer system or computing platform, or similar electronic computing device(s), that manipulates and transforms data represented as physical (electronic) quantities within the computer system's registers and memories into other data similarly represented as physical quantities within the computer system memories or registers or other such information storage, transmission or display devices.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software, including software instructions that perform the operations described herein via memory and one or more processors of a computing platform.

Embodiments of invention also relate to apparatuses for performing the operations herein. Some apparatuses may be specially constructed for the required purposes, or may comprise a general purpose computer(s) selectively activated or configured by a computer program stored in the computer(s). Such a computer program may be stored in a computer readable storage medium, such as, but not limited to, any type of disk including optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms presented herein are not inherently related to any particular computer or other apparatus. Various general purpose systems may be used with programs in accordance with the teachings herein, or it may prove convenient to construct more specialized apparatus to perform the required methods. The structure for a variety of these systems appears from the description herein. In addition, embodiments of the invention are not described with reference to any particular programming language. It will be appreciated that a variety of programming languages may be used to implement the embodiments of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices, etc.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims that follow. Features of the disclosed embodiments can be combined and rearranged in various ways.

What is claimed is:

1. A method for identifying a customer location that can be served by a base-station in a fixed wireless communication system, comprising:
   generating a viewshed for an antenna of the base-station;
   computing an area of a rooftop at the customer location that is included in the generated viewshed, comprising:
      receiving rooftop area information for the at least one customer location;
      identifying a polygon defined by an intersection of the viewshed and rooftop area for the customer location; and
   computing an area of the polygon; and
   identifying the customer location as able to be served by the base-station based on the computed area of the polygon.

2. The method of claim 1, further comprising:
   receiving two-dimensional coordinates of a location of the base-station;
   receiving an elevation of the base-station antenna;
   receiving digital surface model (DSM) data for a geographic area in which the base-station is located;
   wherein generating the viewshed for the base-station antenna comprises:
   generating the viewshed for the base-station antenna based on the received two-dimensional coordinates of the location of the base-station, the received elevation of the base-station antenna, and the received DSM data; and
   providing output containing all points that are visible from base-station antenna.

3. The method of claim 2, further comprising:
   receiving a maximum line-of-sight (LOS) distance or range by which to limit generating the viewshed; and
   wherein generating the viewshed is further based on the received maximum LOS distance, and wherein providing output containing all points that are visible from base-station antenna comprises providing output containing all points that are visible from base-station antenna limited by the maximum LOS distance.

4. The method of claim 2, further comprising:
   receiving two-dimensional coordinates of a location, and an elevation, of an antenna at the customer location; and estimating whether a signal can propagate without obstructions between the base-station antenna and the customer location antenna within a first Fresnel zone, based on the received two-dimensional coordinates of the location of the base-station, the received elevation of the base-station antenna, the received DSM data, and the received location and elevation of the customer location antenna.

5. The method of claim 2, further comprising
receiving information indicative of a radiation pattern of the base-station antenna; and
wherein generating the viewshed for the base-station antenna comprises generating the viewshed for the base-station antenna excluding any areas corresponding to where the radiation pattern of the base-station antenna falls below a threshold.

6. The method of claim 1 further comprising one of: reducing a size of the computed area of the polygon, and removing dis-contiguous regions of the polygon, prior and to computing an area for the polygon.

7. The method of claim 1, wherein identifying the customer location as able to be served by the base-station based on the computed area of the polygon comprises identifying the customer location as able to be served by the base-station when the computed area for the polygon exceeds a first defined threshold.

8. The method of claim 7, further comprising:
identifying the customer location as unable to be served by the base-station when the computed area of the polygon fails to meet a second defined threshold; and
identifying the customer location for scheduling an on-site survey to further assess the customer location as able to be served by the base-station when the computed area of the polygon fails to meet the first defined threshold and exceeds the second defined threshold.

9. The method of claim 8, wherein at least one of the first and second defined thresholds are defined based on one of: a distance between the base-station antenna and the rooftop at the customer location, a type of base-station, and a type of proposed communication radio at the customer location.

10. The method of claim 1, wherein identifying the customer location as able to be served by the base-station based on the computed area of the polygon further comprises identifying the customer location as able to be served by the base-station based on one or more of: a distance between the base-station antenna and the rooftop at the customer location that is below a defined threshold, a type of base-station, a type of proposed communication radio at the customer location.

11. The method of claim 1, further comprising:
computing a distance between the base-station and the customer location;
computing a distance between the base-station and a rooftop of the customer location;
providing a compass bearing for aligning the customer location antenna to the base-station antenna;
estimating an antenna tilt angle of one or both of the base-station antenna and customer location antenna;
estimating an expected received signal strength between the base-station antenna and the customer location antenna;
providing an expected transmission speed or expected range of transmission speeds between the base-station antenna and the customer location antenna; and
wherein identifying the customer location as able to be served by the base-station based on the computed area of the polygon comprises identifying the customer location as able to be served by the base-station based on one or more of:
the computed area of the polygon;
the computed distance between the base-station and the customer location;
the computed distance between the base-station and a rooftop of the customer location;
the compass bearing for aligning the customer location antenna to the base-station antenna;
the estimated antenna tilt angle of one or both of the base-station antenna and customer location antenna;
the estimated expected received signal strength between the base-station antenna and the customer location antenna; and
the expected transmission speed or expected range of transmission speeds between the base-station antenna and the customer location antenna.

12. Non-transitory computer readable storage media having instructions stored thereon that, when executed by a processor of a system, the instructions cause the system to perform operations for identifying a customer location that can be served by a base-station in a fixed wireless communication system, comprising:
generating a viewshed for an antenna of the base-station;
computing an area of a rooftop at the customer location that is included in the generated viewshed, comprising:
receiving rooftop area information for the at least one customer location;
identifying a polygon defined by an intersection of the viewshed and rooftop area for the customer location; and
computing an area of the polygon; and
identifying the customer location as able to be served by the base-station based on the area of the polygon.

13. The non-transitory computer readable storage media of claim 12, further comprising:
receiving two-dimensional coordinates of a location of the base-station;
receiving an elevation of the base-station antenna;
receiving digital surface model (DSM) data for a geographic area in which the base-station is located;
wherein generating the viewshed for the base-station antenna comprises:
generating the viewshed for the base-station antenna based on the received two-dimensional coordinates of the location of the base-station, the received elevation of the base-station antenna, and the received DSM data; and
providing output containing all points that are visible from base-station antenna.

14. The non-transitory computer readable storage media of claim 13, further comprising:
receiving a maximum line-of-sight (LOS) distance or range by which to limit generating the viewshed; and
wherein generating the viewshed is further based on the received maximum LOS distance, and wherein providing output containing all points that are visible from base-station antenna comprises providing output containing all points that are visible from base-station antenna limited by the maximum LOS distance.

15. The non-transitory computer readable storage media of claim 13, further comprising:
receiving two-dimensional coordinates of a location, and an elevation, of an antenna at the customer location; and estimating whether a signal can propagate without obstructions between the base-station antenna and the customer location antenna within a first Fresnel zone, based on the received two-dimensional coordinates of the location of the base-station, the received elevation of the base-station antenna, the received DSM data, and the received location and elevation of the customer location antenna.

16. The non-transitory computer readable storage media of claim 13, further comprising receiving information indicative of a radiation pattern of the base-station antenna; and wherein generating the viewshed for the base-station antenna comprises generating the viewshed for the base-station antenna excluding any areas corresponding to where the radiation pattern of the base-station antenna falls below a threshold.

17. The non-transitory computer readable storage media of claim 12, wherein identifying the customer location as able to be served by the base-station based on the computed area of the polygon comprises identifying the customer location as able to be served by the base-station when the computed area of the polygon exceeds a first defined threshold, and further comprising:

identifying the customer location as unable to be served by the base-station when the computed area of the polygon fails to meet a second defined threshold; and identifying the customer location for scheduling an on-site survey to further assess the customer location as able to be served by the base-station when the computed area of the polygon fails to meet the first defined threshold and exceeds the second defined threshold.

18. The non-transitory computer readable storage media of claim 11, further comprising:

computing a distance between the base-station and the customer location;

computing a distance between the base-station and a rooftop of the customer location;

providing a compass bearing for aligning the customer location antenna to the base-station antenna;

estimating an antenna tilt angle of one or both of the base-station antenna and customer location antenna;

estimating an expected received signal strength between the base-station antenna and the customer location antenna;

providing an expected transmission speed or expected range of transmission speeds between the base-station antenna and the customer location antenna; and wherein identifying the customer location as able to be served by the base-station based on the computed area of the polygon comprises identifying the customer location as able to be served by the base-station based on one or more of:

the computed area of the polygon;

the computed distance between the base-station and the customer location;

the computed distance between the base-station and a rooftop of the customer location;

the compass bearing for aligning the customer location antenna to the base-station antenna;

the estimated antenna tilt angle of one or both of the base-station antenna and customer location antenna;

the estimated expected received signal strength between the base-station antenna and the customer location antenna; and the expected transmission speed or expected range of transmission speeds between the base-station antenna and the customer location antenna.

* * * * *

UNITED STATES PATENT AND TRADEMARK OFFICE
CERTIFICATE OF CORRECTION

| | |
|---|---|
| PATENT NO. | : 11,910,201 B2 |
| APPLICATION NO. | : 17/258735 |
| DATED | : February 20, 2024 |
| INVENTOR(S) | : Georgios Ginis et al. |

It is certified that error appears in the above-identified patent and that said Letters Patent is hereby corrected as shown below:

In the Claims

Claim 18, Line 2 should be corrected to read "The non-transitory computer readable storage media of claim 12, further comprising:"

Signed and Sealed this
Twenty-third Day of April, 2024

*Katherine Kelly Vidal*

Katherine Kelly Vidal
*Director of the United States Patent and Trademark Office*